United States Patent
Salehi et al.

(10) Patent No.: US 8,752,003 B2
(45) Date of Patent: Jun. 10, 2014

(54) MODEL DRIVEN APPROACH FOR AVAILABILITY MANAGEMENT FRAMEWORK (AMF) CONFIGURATION GENERATION

(75) Inventors: Pejman Salehi, Mississauga (CA); Maria Toeroe, Montreal (CA); Abdelwahab Hamou-Lhadj, Dollard-des-Ormeaux (CA); Pietro Colombo, Venegono Inferiore (IT); Ferhat Khendek, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 397 days.

(21) Appl. No.: 13/099,880

(22) Filed: May 3, 2011

(65) Prior Publication Data

US 2011/0270595 A1    Nov. 3, 2011

Related U.S. Application Data

(60) Provisional application No. 61/330,683, filed on May 3, 2010, provisional application No. 61/370,068, filed on Aug. 2, 2010.

(51) Int. Cl.
G06F 9/44    (2006.01)

(52) U.S. Cl.
USPC .......................... 717/104; 717/120; 717/121

(58) Field of Classification Search
None
See application file for complete search history.

(56) References Cited

U.S. PATENT DOCUMENTS

| 6,038,677 | A | 3/2000 | Lawlor et al. |
| 6,601,234 | B1 * | 7/2003 | Bowman-Amuah .......... 717/108 |
| 6,640,238 | B1 * | 10/2003 | Bowman-Amuah .......... 709/201 |
| 7,424,701 | B2 | 9/2008 | Kendall et al. |
| 7,487,493 | B1 * | 2/2009 | Faulkner ....................... 717/105 |
| 8,006,130 | B2 | 8/2011 | Kanso et al. |
| 2003/0140333 | A1 * | 7/2003 | Odaka et al. .................. 717/115 |
| 2009/0164767 | A1 | 6/2009 | Kanso et al. |
| 2009/0164832 | A1 * | 6/2009 | Kanso et al. ..................... 714/1 |
| 2011/0179419 | A1 * | 7/2011 | Gusev et al. .................. 718/100 |

FOREIGN PATENT DOCUMENTS

EP    1271847 A2    1/2003

OTHER PUBLICATIONS

Tarkoma, "Introduction to Service Availability Forum," Spring 2003.*

(Continued)

*Primary Examiner* — Insun Kang
(74) *Attorney, Agent, or Firm* — Ericsson Inc.

(57) ABSTRACT

A method and system for generating an Availability Management Framework (AMF) configuration based on a model driven approach. The AMF configuration is an instance of an AMF sub-profile that can be used to model resources and services to be protected, and is generated from an instance of the Entity Type Files (ETF) sub-profile and an instance of the Configuration Requirements (CR) sub-profile. The ETF sub-profile can be used to model the resources provided by vendors, and the CR sub-profile can be used to model configuration requirements. Each of the AMF sub-profile, the ETF sub-profile and the CR sub-profile is a specialization of pre-defined Unified Modeling Language (UML) meta-classes. An input that includes an ETF model and a CR model, which are instances of the ETF sub-profile and the CR sub-profile, respectively, is transformed into an AMF model as the AMF configuration.

20 Claims, 19 Drawing Sheets

(56) References Cited

OTHER PUBLICATIONS

Gherbi et al., "Capturing and Formalizing SAF Availability Management Framework Configuration Requirements," DE@CAiSE'09, 2009.*

Kanso, "Automatic Generation of AMF Compliant Configurations," Concordia university, Aug. 2008.*

Kanso et al., "Automatic Generation of AMF Compliant Configurations," Springer-Verlag Berlin Heidelberg 2008.*

Jouault et al., "ATL: A model transformation tool," © 2008 Elsevier B.V.*

Kanso et al., "Generating AMF Configurations from Software Vendor Constraints and User Requirements," IEEE, 2009.*

Service Availability Forum Application Interface Specification; Availability Management Framework SAI-AIS-AMF-B.04.01; Sep. 30, 2011; 452 pages.

Service Availability Forum Hardware Platform Interface; Specification SAI-HPI-B.03.02; Sep. 30, 2011; 312 pages.

Unified Modeling Language: Superstructure; version 2.1.1 (With change bars) formal/Feb. 3, 2007; OMG (Object Management Group); Feb. 2007; 732 pages.

Meta Object Facility (MOF) Core Specification OMG Available Specification Version 2.0 formal/Jun. 1, 2001; OMG (Object Management Group); Jan. 2006; 88 pages.

Service Availability Forum—Application Interface Specification, Information Model Management Service, SAI-AIS-IMM-A.03.01 from Release 6.1, Feb. 19, 2010; 202 pages.

Service Availability Forum—Application Interface Specification, Software Management Framework, SAI-AIS-SMF-A.01,02 from Release 6.1, Feb. 19, 2010; 174 pages.

Service Availability Forum—Service Availability interface, Overview. SAI-Overview-B.05.03; from Release 6.1, Feb. 19, 2010: 68 pages.

Service Availability Forum—Specification for HPI Mapping to AdvancedTCA and MicroTCA: SAIM-HPI-B.03.02-xTCA, Dec. 4, 2009; 254 pages.

Kanso, A. et al.; Generating AMF Configurations from Software Vendor Constraints and User Requirements; 2009; from p. 454 to 461.

Kanso, A. et al.: "Automatic Generation of AMF Compliant Configurations"; 2008; 16 pages.

Jouault, Frederic et al.: "ATL: A model transformation tool"; from journal of Science of Computer Programming, 2008; pp. 31 to 39.

Szatmari, Zoltan et al.: "Applying MDA approach for the SA Forum platform"; Jun. 3, 2008; 6 pages.

Kovi, Andras et al.: "UML profile and design patterns library (preliminary version)" Project full title: "Highly dependable ip-based networks and services"; project No. IST-FP6-STREP-26979; Mar. 29, 2007; 120 pages.

Selic, Bran, IBM Canada: "A Systematic Approach to Domain-Specific Language Design Using UML"; 2007; 8 pages.

Kovi, Andras et al.: "An Eclipse-Based Framework for AIS Service Configurations" May 21, 2007; 17 pages.

Leroux: D. et al.: "Rational Software Architect: A tool for domain-specific modeling"; IBM Systems Journal, vol. 45, No. 3, 2006; pp. 555 to 568.

Hinrich, T. et al.; "Using Object-Oriented Constraint Satisfaction for Automated Configuration Generation"; Aug. 17, 2004; pp. 159 to 170.

Fuentes-Fernandez, Lidia et al.: "An Introduction to UML Profile"; UPGRADE, vol. V, No. 2, Apr. 2004; p. 1 and pp. 6 to 13.

Sahai, Akhil et al.: "Automated Generation of Resource Configurations through Policies"; Hewlett-Packard Laboratories, Palo Alto, CA 94034, USA; Jun. 2-3, 2004, 14 pages.

Czarnecki, Krzysztof et al.; "Classification of Model Transformation Approaches", University of Waterloo, Canada; 2003; 17 pages.

Warmer, J. et al.: The Object Constraint Language—Getting Your Models Ready for MDA, 2nd. edition; Sep. 6, 2003; 4 pages.

Tarkoma, Sasu: "Introduction to Service Availability Forum": Seminar on High Availability and Timeliness in Linux; University of Helsinki, Department of Computer Science; Spring 2003; 11 pages.

Vogels, Werner et al.: "The Design and Architecture of the Microsoft Cluster Service—A Practical Approach to High-Availability and Scalability", Sep. 2, 1998, 10 pages.

* cited by examiner

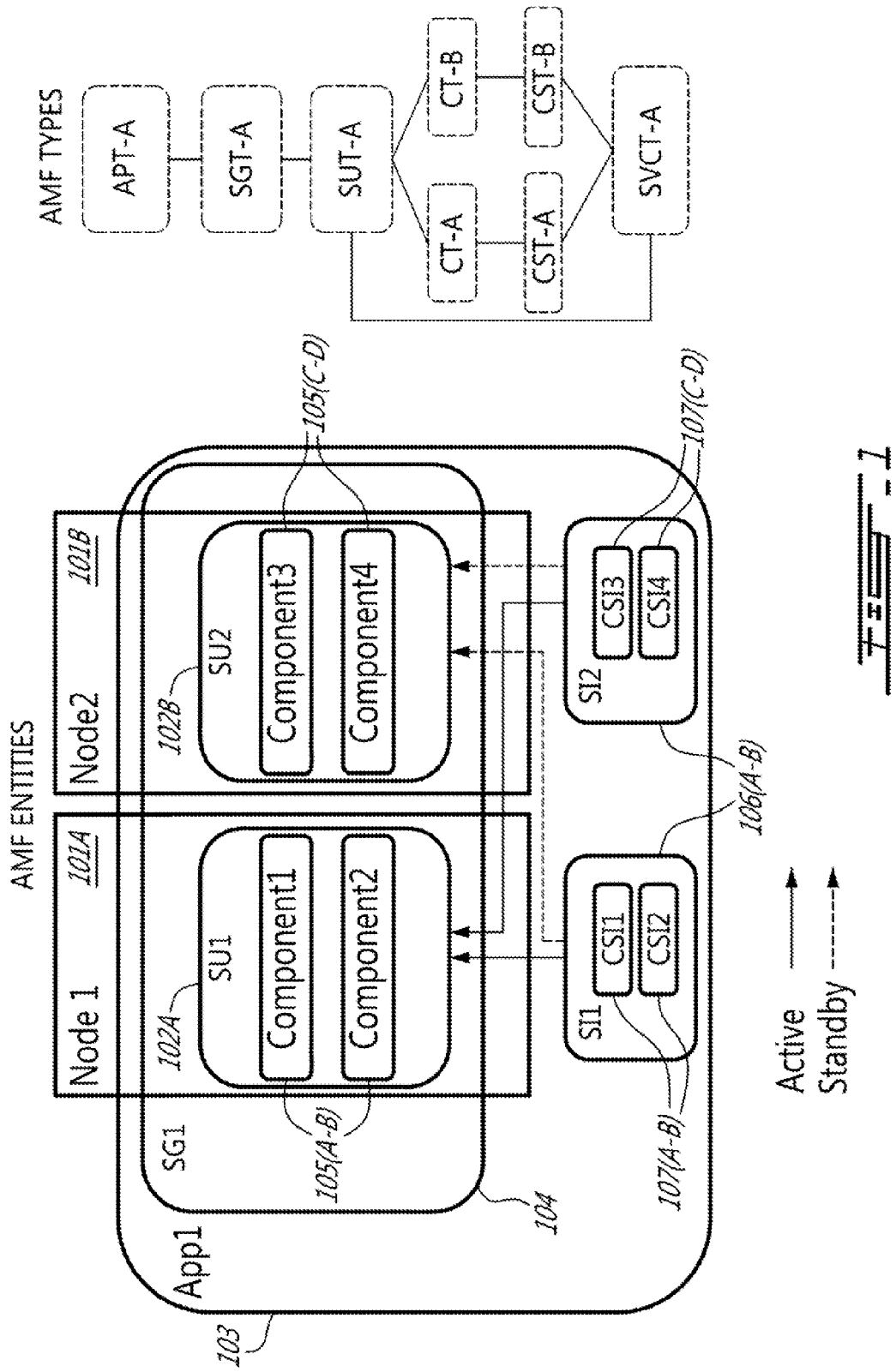

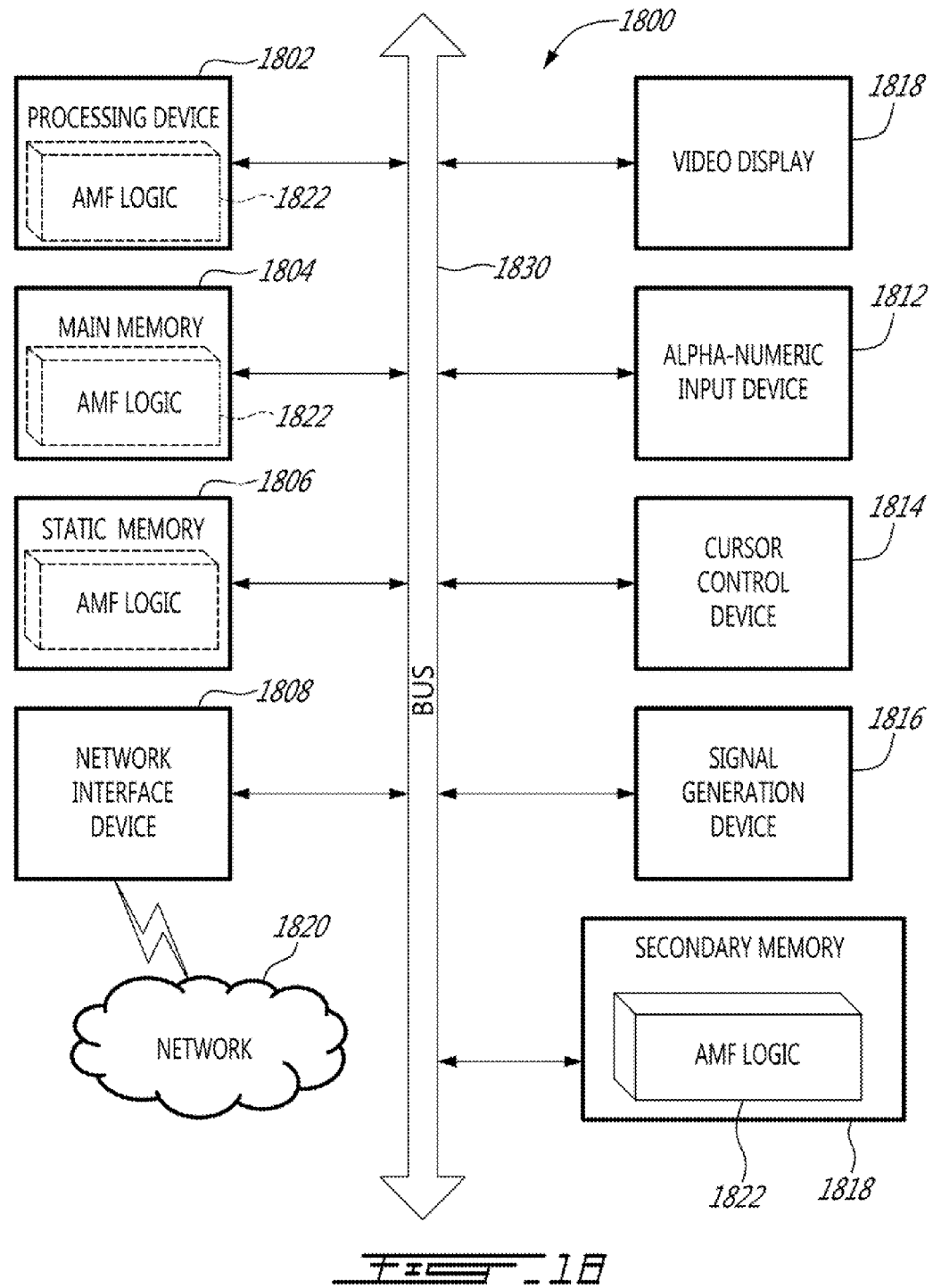

MODEL DRIVEN APPROACH FOR AVAILABILITY MANAGEMENT FRAMEWORK (AMF) CONFIGURATION GENERATION

CROSS-REFERENCE TO RELATED APPLICATIONS

This application claims the benefit of U.S. Provisional Application No. 61/330,683, filed May 3, 2010, and U.S. Provisional Application No. 61/370,068, filed Aug. 2, 2010, both of which are hereby incorporated by reference.

TECHNICAL FIELD

This disclosure relates generally to generation of Availability Management Framework (AMF) configurations.

BACKGROUND

The Service Availability Forum (SAF) is a consortium of several computing and telecommunications companies that develops, publishes, promotes, and provides education on open specifications that standardize high availability platforms. The solution which is offered by SAF facilitates high availability alongside service continuity. It also enables the use of Commercial-Of-The-Shelf (COTS) and improves the portability of hardware and software components. SAF members have developed a set of specifications that describe various services that when implemented form a complete middleware for high-availability. A set of application programming interfaces (APIs) has also been defined to standardize the interface between the applications and the middleware that implements SAF specifications (that we refer to as a SAF middleware). The SAF specifications are divided into the Application Interface Specification (AIS) (see, e.g., Service Availability Forum, Application Interface Specification. Availability Management Framework SAI-AIS-AMF-B.04.01), which defines several services required for the high-availability of applications, and the Hardware Platform Interface (HPI) (see, e.g., Service Availability Forum, Hardware Platform Interface SAI-HPI-B.03.02), which provides standard means to control and monitor hardware components.

The Availability Management Framework (AMF) is part of the AIS middleware, which is responsible for managing the availability of the services provided by an application. AMF achieves this by maintaining redundant components of an application and by dynamically shifting a workload of faulty components to the healthy ones; all according to a configuration provided to AMF as an input.

AMF configuration generation is the process of designing a configuration for a software system that is controlled by an implementation of AMF. Such a system may be provided by the vendors, and preferably satisfies a set of configuration requirements specified by the configuration designer. One skilled in the art will appreciate that vendors do not always provide such information, and in a multi-supplier environment no single resource is able to provide this information.

The design of AMF configurations typically requires 1) the descriptions of software resources to be used, and 2) the requirements that specify the services to be provided and their characteristics in AMF terms. Due to the numerous parameters that should be taken into consideration, the design of AMF configurations is a complex and error prone task if done manually. Also, the relationships among different configuration entities constrain the admissible values of various parameters and attributes.

Therefore, it would be desirable to provide a system and method that obviate or mitigate the above described problems

SUMMARY

Other aspects and features of the present invention will become apparent to those ordinarily skilled in the art upon review of the following description of specific embodiments of the invention in conjunction with the accompanying figures.

According to one embodiment of the invention, a method is implemented on a computer system to generate an Availability Management Framework (AMF) configuration for providing services and protecting the services against resource failure. The AMF configuration is an instance of an AMF sub-profile defining AMF elements that can be used to model the resources and the services. The AMF configuration can be generated from an instance of an Entity Types File (ETF) sub-profile, which is called an ETF model, and an instance of the Configuration Requirements (CR) sub-profile, which is called a CR model. The ETF model defines a set of ETF prototypes, which can be used to model the resources provided by vendors, and the CR model defines a set of CR elements, which can be used to model configuration requirements. Each of the AMF sub-profile, the ETF sub-profile and the CR sub-profile is a specialization of a pre-defined Unified Modeling Language (UML) meta-model. The method comprises the steps of receiving the ETF model and the CR model. The method further comprises the step of applying a set of transformation rules to transform the ETF model and the CR model into an AMF model as the AMF configuration. The AMF model is an instance of the AMF sub-profile and includes a set of the AMF elements. The set of transformation rules are pre-defined for the ETF sub-profile, the CR sub-profile and the AMF sub-profile. The AMF configuration is stored for availability management.

Embodiments of the invention organize the CR model as a first hierarchy of the CR elements, and the ETF model as a second hierarchy of the ETF prototypes. One or more levels of the first hierarchy are missing in the second hierarchy. The method further comprises the steps of: transforming a selected subset of the ETF prototypes into a corresponding collection of the AMF elements, which are organized as a hierarchy that also does not have those one or more missing levels; building the one or more missing levels from the collection of the AMF elements based on the relationship between the missing levels and existing levels of the first and second hierarchies.

According to another embodiment of the invention, a non-transitory computer readable storage medium stores instructions that, when executed by a computer system, cause the computer system to perform the above-described method of generating an AMF configuration.

According to yet another embodiment of the invention, a computer system is adapted to generate an AMF configuration for providing services and protecting the services against resource failure. The AMF configuration is an instance of an AMF sub-profile defining a set of AMF elements that can be used to model the resources and the services. The AMF configuration can be generated from an instance of the ETF sub-profile, which is called an ETF model, and an instance of the CR sub-profile, which is called a CR model. The ETF model defines a set of ETF prototypes, which can be used to model the resources provided by vendors. The CR model defines a set of CR elements, which can be used to model configuration requirements. Each of the AMF sub-profile, the ETF sub-profile and the CR sub-profile is a specialization of a pre-defined UML meta-model. The computer system comprises a memory to store the ETF model and the CR model. The computer system also comprises a processor coupled to the memory and adapted to perform the above-described method of generating an AMF configuration.

Other aspects and features will become apparent to those ordinarily skilled in the art upon review of the following description of specific embodiments of the invention in conjunction with the accompanying figures.

BRIEF DESCRIPTION OF THE DRAWINGS

The invention may best be understood by referring to the following description and accompanying drawings that are used to illustrate embodiments of the invention. In the drawings:

FIG. 1 illustrates an example of an AMF configuration.

FIG. 18 illustrates a diagrammatic representation of a computer system according to one embodiment of the invention.

DETAILED DESCRIPTION

Figure 2A:
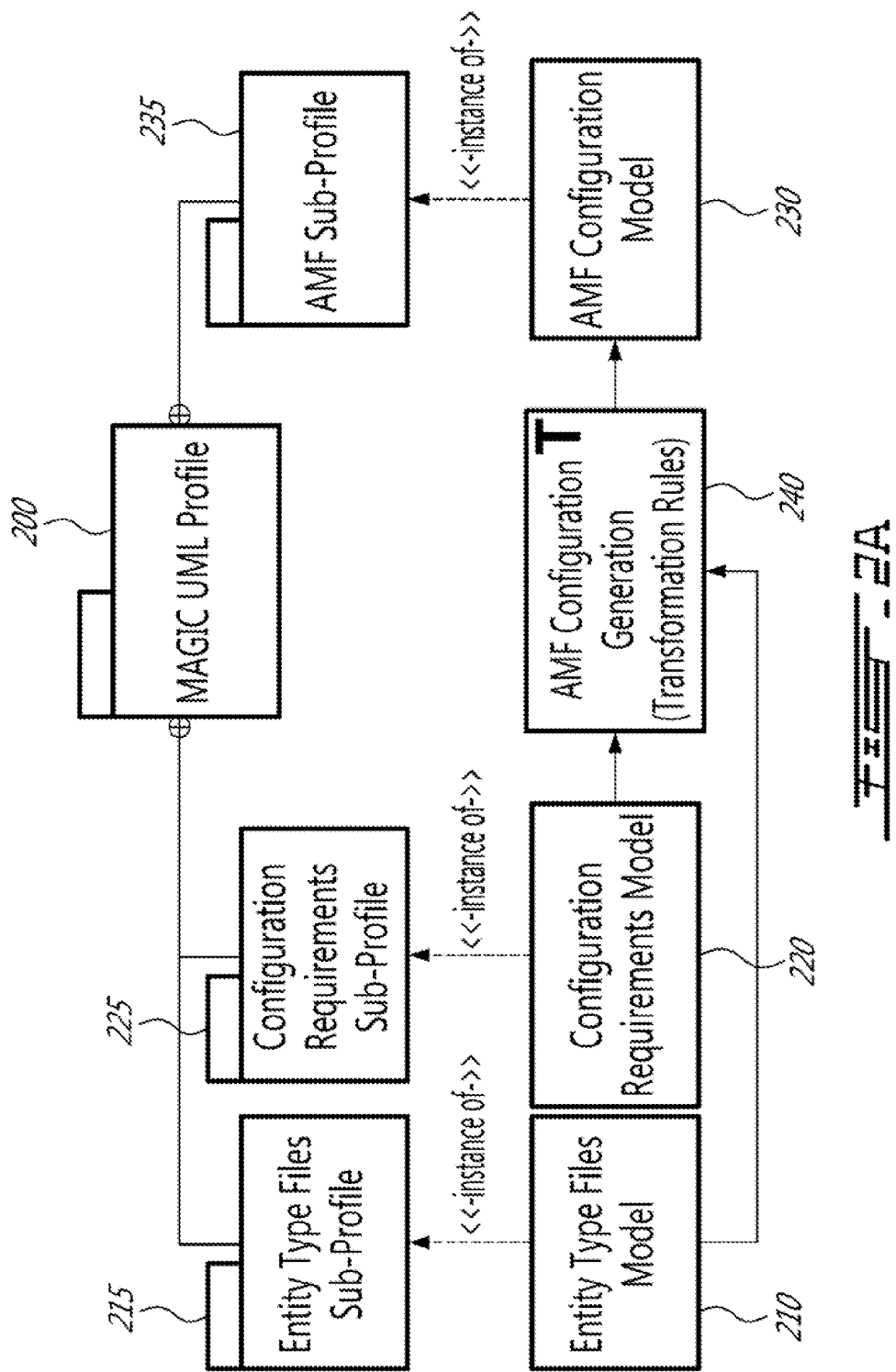
FIG. 2A is a diagram illustrating a model driven approach for generating AMF configurations according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a model driven approach for generating AMF configurations. The model driven approach is an automated solution that produces valid configurations by design. The model driven approach alleviates designers from cumbersome tasks and details. The model driven approach utilizes a modeling framework and model based transformations, which allow for the manipulation of AMF domain concepts, thereby increasing the level of abstraction of the design process and enabling extendibility and validation. Some advantages of embodiments of the invention are described as follows.

The model driven approach reduces the complexity of AMF configuration generation. It increases the level of abstraction at which a designer specifies configuration properties. Thus, details of some configuration properties can be abstracted away. This abstraction simplifies the generation process and reduces potential errors and inconsistencies.

Embodiments of the invention use models as artifacts directly involved in the configuration generation. The models are transformed based on transformation rules expressed in a declarative style. These transformation rules abstract from the operational steps that have to be performed in order to generate the target elements. These transformation rules specify the characteristics of the elements that have to be created without imposing operational constraints on how the target elements need to be created.

Embodiments of the invention are modular and stepwise. Each step is supported by a set of transformation rules. The input and output of each transformation is an instance of one or more pre-defined sub-profiles. Therefore, the interfaces between the different generation steps are formally defined in terms of modeling artifacts. As a result, embodiments of the invention are flexible and can be easily extended and refined.

Embodiments of the invention can be implemented based on standard languages and tools such as Unified Modeling Language (UML), Object Constraint Language (OCL), and ATLAS Transformation Language (ATL) (which is an implementation of the Query/View/Transformation (QVT) standard from Object Management Group (OMG)) (see, Object Management Group, Meta Object Facility (MOF) 2.0 Query/View/Transformation Specification). It is understood that other languages and tools can also be used.

FIG. 1 illustrates an example of an AMF configuration, which can be generated using a model driven approach according to one embodiment of the invention. The AMF configuration includes AMF entities and AMF Types (also referred to as AMF entity types). Each of the AMF entities and the AMF Types is referred to as an AMF element or an AMF configuration element. In this example, the AMF entities include a cluster that is composed of two nodes (Node1 101A and Node2 101B). The cluster hosts an Application (App) 103 consisting of one service group (SG) 104 that protects two service instances (SIs) 106A and 106B in a 2N redundancy model according to the AMF specification (see, e.g., Service Availability Forum, Application Interface Specification. Availability Management Framework SAI-AIS-AMF-B.04.01). Each SI 106 includes two Component Service Instances (CSIs), 107A-B or 107C-D, each of the CSIs indicating a workload. The SG 104 includes two service units (SUs) 102A and 102B, each further including two Components (105A-B and 105C-D, respectively). According to the redundancy model, each SI 106 is assigned to an active SU 102 and a standby SU 102. When an SI 106 is assigned to an SU 102, its composing CSIs 107 are also assigned to the components of the SU 102. This assignment occurs at run-time and not at configuration time.

The AMF entities presented in the configuration are described by their corresponding AMF Types (also referred to as AMF entity types): Component1 (105A) and Component3 (105C) are from the component type CT-A, while Component2 (105B) and Component4 (105D) from CT-B. Both SUs 102 are represented by the same SU type called SUT-A. The SG 104 and the Application 103 are from the SG type SGT-A and the application type APT-A, respectively. At the service level, both SIs 106 are from the service type SVCT-A, while CSI1 (107A) and CSI3 (107C) are from the component service type CST-A, and CSI2 (107B) and CSI4 (107D) are from the type CST-B. In the description herein, the component type, SU type, SG type, application type, service type, component service type are also referred to as CompType, SUType, SGType, AppType, SvcType, and CSType, respectively.

In the following, embodiments of a model driven configuration generation approach are described based on a UML profile which has been created as a specialization of the pre-defined UML meta-model in the UML specification (Object Management Group: Unified Modeling Language—Superstructure Version 2.1.1 formal/2007-02-03). This UML profile (which is also referred to as the MAGIC UML Profile) captures the concepts related to configuration requirements, software description, and AMF configurations in three different sub-profiles. The approach generates AMF configurations through transformation of the models of the MAGIC UML Profile. To facilitate comprehension, all of the transformations are described herein using Atlas Transformation Language (ATL). It is understood that other transformation languages may be used.

1. Modeling Framework

The AMF configuration generation is characterized by elements that can be categorized into three different sub-domains: AMF configuration elements, Entity Types File (ETF), and Configuration Requirements. The main concept of the modeling framework is the MAGIC UML Profile described above. It contains the complete and comprehensive definitions of all the domain concepts, the relationships as well as the constraints between them. The MAGIC UML Profile is structured into three sub-profiles according to the three sub-domains.

1.1 Availability Management Framework (AMF) Sub-Profile. An AMF configuration for a given application is a logical organization of resources for providing and protecting services. The AMF sub-profile specifies both the resources and the services.

In an AMF configuration, resources and services are represented through a logical structure that allows AMF to manage resources in order to provide service availability. An AMF configuration consists of two different set of elements: AMF entities and AMF entity types, both of which are defined in the AMF sub-profile. Embodiments of the invention model these elements as UML stereotypes and group them into two packages, namely, the AMF entity and the AMF entity type packages.

The elements of the AMF entity package model both the services and the service provider resources. The basic elements of the AMF entity package are called Components (e.g., the Components 105 of FIG. 1). Components represent HW and/or SW resources capable of supporting some units of workload imposed by service functionalities. Such a unit of workload is referred to as a Component Service Instance (CSI) (e.g., the CSI 107 of FIG. 1). Components are aggregated into Service Units (SUs) (e.g., the SU 102 of FIG. 1), which are logical entities representing the basic redundancy unit in an AMF configuration.

The aggregation of components models the combination of their functionalities into higher level services. More specifically, a Service Instance (SI) (e.g., the SI 106 of FIG. 1) is the aggregation of the workloads of components contained in an SU. An SI represents a workload assigned to the SU. SUs are further grouped into Service Groups (SG) (e.g., the SG 104 of FIG. 1) to protect a set of SIs by means of redundancy. SGs are classified according to the redundancy models used by AMF to protect the services. Finally, an AMF application (e.g., the App 103 of FIG. 1) combines different SGs in order to provide the sets of SIs protected by these SGs. Each SU is deployed on an AMF node and the set of all AMF nodes forms the AMF cluster.

The set of stereotypes that model the entities that provide the services are grouped into a package called Service Provider, while the elements that model the services are aggregated into the Service package.

Similar to the AMF entity, the AMF entity type package is parted into two packages which group the service providers' and the service entity types. AMF entity type elements model the common characteristics among multiple instances of the previously defined logical entities. In AMF all entities except the deployment entities (Node, Cluster) have a type. For example, the AMF entity types include: the Component Types, the Component Service Types (CSTypes), Service Type (SvcType), Service Unit Type (SUType), Service Group Type (SGType), and the ApplicationType (AppType).

1.2 Entity Types Files (ETF) Sub-profile. Vendors provide a description of their software in terms of implemented entity prototypes by means of XML files called ETF. These entity prototypes, also referred to as ETF prototypes, specify intrinsic characteristics of the software as well as its capabilities and limitations. Moreover, they describe how the software entities can be combined by providing information regarding their dependencies and compatibility options. The ETF sub-profile consists of elements which model these entity prototypes. Entity prototypes and AMF entity types describe the same logical entities from two different perspectives. AMF entity types deal with types from a configuration and runtime management point of view and therefore define a particular deployment option, while ETF projects the description of the software form the vendor's point of view, which needs to allow for all possible deployment options. As a consequence, the ETF sub-profile that models the ETF prototypes has a structure similar to the AMF entity type package of the AMF sub-profile.

1.3 Configuration Requirements (CR) Sub-profile. Configuration requirements specify the set of services to be provided by given software through the target AMF configuration. More specifically, they define different characteristics of the services such as their type, the number of instances of a certain service type, the relationships between services, and the level of the protection in terms of redundancy model. The CR sub-profile supports the specification of the requirements by means of template elements. These elements help a configuration designer to specify common characteristics shared by multiple SGs, SIs, CSIs, and Nodes and as well as the Cluster on which the software will be deployed. More specifically, the CR sub-profile defines a CSITemplate that specifies the CSType with the required number of CSIs. The CR sub-profile also defines an SITemplate that specifies the SIs with the associated SvcType. Moreover, the CR sub-profile defines an SGTemplate that aggregates a set of SITemplates and specifies the required redundancy model to protect the SIs of the aggregated SITemplates. Finally, the required deployment infrastructure is specified in terms of NodeTemplate. Moreover, the properties of the cluster are modeled using an element called Cluster. Variables are modeled in terms of attributes of the CR's model elements.

1.4 Relationships between the sub-profiles. In order to generate AMF configurations using a model driven approach, the aforementioned sub-profiles also define relationships that can be used by instances of the sub-profiles to relate to each other. The relationships are used to navigate the model transformation in order to select model elements and to retrieve all the information that is required to generate an AMF configuration. These relationships can be modeled in terms of UML associations between the elements of the CR sub-profile on one side and elements of the ETF and AMF sub-profiles on the other side.

FIG. 2A is a diagram that illustrates a process of AMF configuration generation according to one embodiment of the invention. The model driven approach consists of a set of transformations among an ETF model 210, a CR model 220 and an AMF configuration model 230, which are instances of an ETF sub-profile 215, a CR sub-profile 225 and an AMF sub-profile 235, respectively. These sub-profiles 215, 225 and 235 are part of a UML profile 200 (e.g., the MAGIC UML Profile). The input for the transformation consists of configuration requirements specified in the CR model 220 and the description of the software specified in the ETF model 210, while the output of the transformation is an AMF configuration (represented by the AMF configuration model 230) for the software which satisfies the configuration requirements. The input and output are modeled as instances of the corresponding sub-profiles. Boxes annotated (e.g. 240) with "T" represent transformations.

Figure 2B:
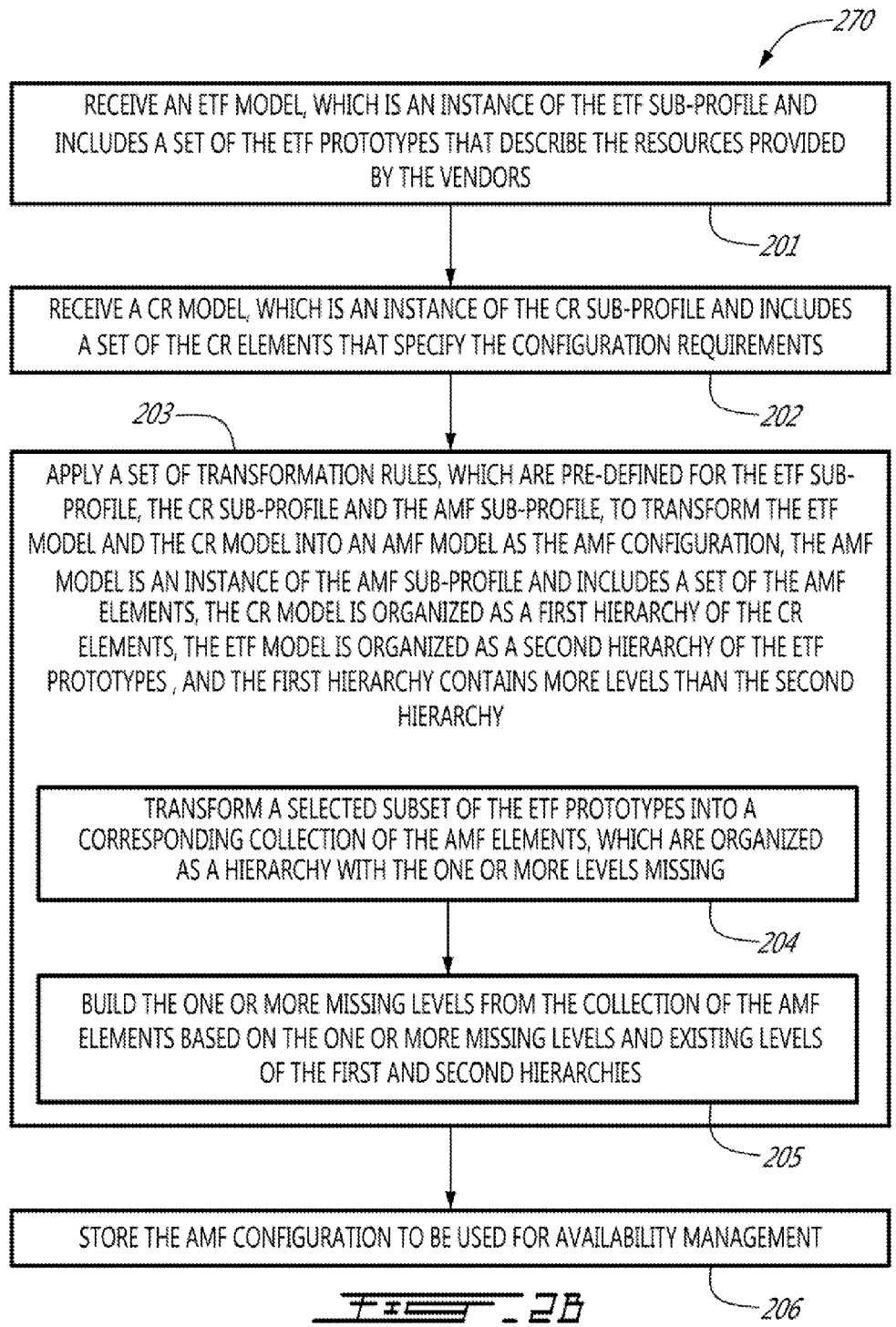
FIG. 2B is a flow diagram illustrating a method of generating AMF configurations using a model driven approach according to one embodiment of the invention.

FIG. 2B is a flow diagram illustrating a method 270 of generating AMF configurations using a model driven approach according to one embodiment of the invention. The method 270 may be performed by hardware (e.g., circuitry, dedicated logic, programmable logic, microcode, etc.), software (e.g., instructions run on a processing device), or a combination thereof. In one embodiment, the method 270 is performed by a computer system 1800 of FIG. 18.

Referring to FIG. 2B, in one embodiment, the method 270 begins with a computer system receiving an ETF model (block 201) and a CR model (block 202). The ETF model is an instance of the ETF sub-profile, and defines a set of the ETF prototypes. The set of the ETF prototypes describes the resources (e.g. software) provided by the vendors. The CR model is an instance of the CR sub-profile, and defines a set of the CR elements. The set of the CR elements specifies the configuration requirements.

Subsequently, the computer system applies a set of transformation rules to transform the ETF model and the CR model into an AMF model as the AMF configuration (block 203). The AMF model is an instance of the AMF sub-profile and defines a set of the AMF elements of the AMF sub-profile. The transformation rules are a set of pre-defined rules for transforming the ETF prototypes of the ETF sub-profile, and the CR elements of the CR sub-profile into the AMF elements of the AMF sub-profile.

In one embodiment, the CR model is organized as a first hierarchy of the CR elements and the ETF model is organized as a second hierarchy of the ETF prototypes. One or more levels of the first hierarchy can be missing in the second hierarchy. For example, the CR model specifies a CSITemplate, which has the corresponding level in the ETF model associated with the CSType and the Component Type. As a second example, the CR model also specifies an SITemplate, which however may not have the corresponding level in the ETF model, that is, the level associated with the SvcType and the SUType. Thus, in one embodiment, the computer system transforms a selected subset of the ETF prototypes into a collection of the AMF elements, which are organized as a hierarchy that also does not have the one or more missing levels (block 204). The computer system builds the one or more missing levels from the collection of the AMF elements based on the relationship between the missing levels and existing levels of the first and second hierarchies to form the AMF model (block 205). The computer system stores the AMF configuration in memory, data storage or other memory devices for used by management systems or software for availability management (block 206).

Figure 2C:
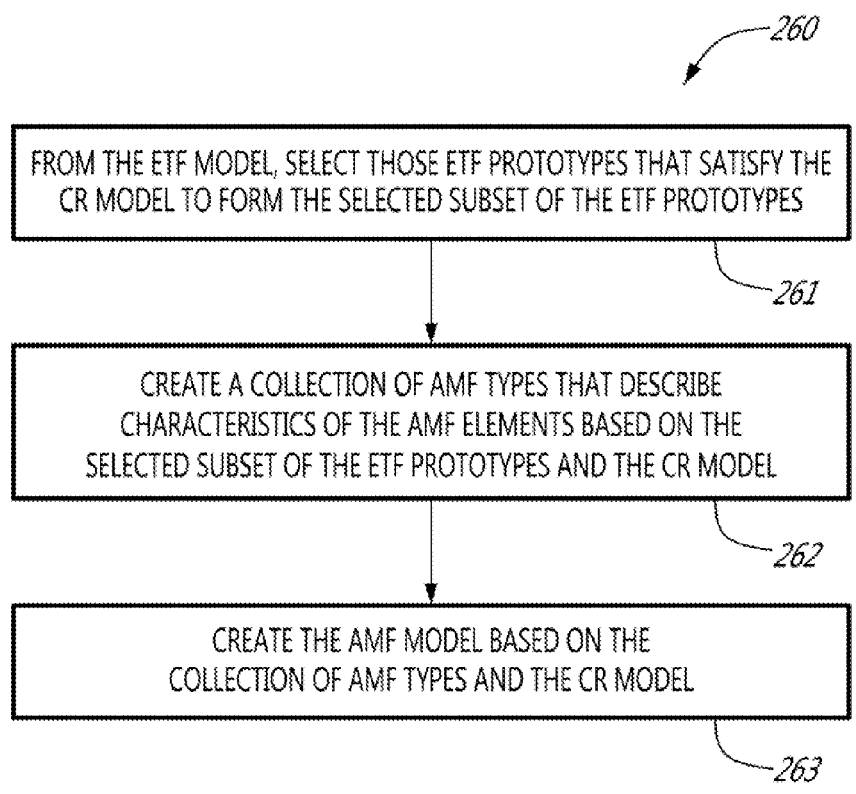
FIG. 2C is a flow diagram illustrating a method of applying transformations in the generation of AMF configurations according to one embodiment of the invention.

FIG. 2C is a flow diagram illustrating a method 260 of applying the transformations (block 203 of FIG. 2B) in the generation of AMF configurations according to one embodiment of the invention. The method 260 may be performed by hardware (e.g., circuitry, dedicated logic, programmable logic, microcode, etc.), software (e.g., instructions run on a processing device), or a combination thereof. In one embodiment, the method 260 is performed by a computer system 1800 of FIG. 18.

Referring to FIG. 2C, in one embodiment, the method 260 begins with the computer system selecting the ETF prototypes that satisfy the configuration requirements from the set of the ETF prototypes provided by the vendors (block 261). The computer system creates a collection of AMF Types that describe characteristics of the AMF elements based on the selected subset of the ETF prototypes and the CR model (block 262). The computer system then creates a set of the AMF elements based on the collection of AMF Types and the CR model to form the AMF configuration (block 263). The transformation process will be described in more detail below in Section 2.

2. Model Transformation Process

Figure 3A:
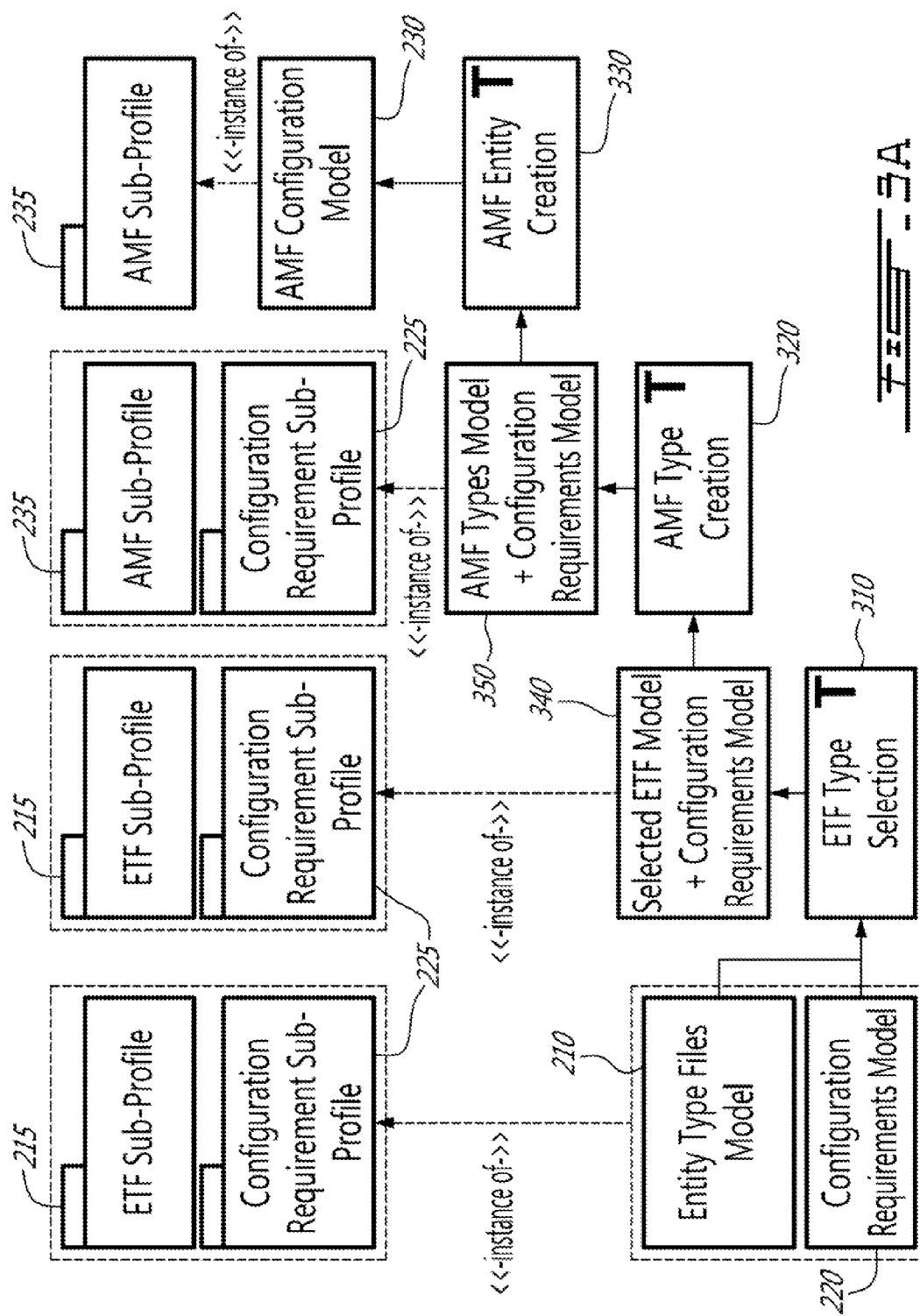
FIG. 3A illustrates transformation phases of the model driven AMF configuration generation according to one embodiment of the invention.

FIG. 3A illustrates a transformation process 300 according to embodiments of the invention. In one embodiment, the transformation process 300 includes three distinct phases, namely, the selection of the software to be used to satisfy the requirements (block 310), the creation of proper AMF entity types based on the selected ETF prototypes (block 320), and the instantiations of AMF entities related to each AMF entity types (block 330). More specifically, the configuration generation proceeds with selecting the appropriate ETF prototypes for each service specified by the configuration requirements. Therefore, the selected software is used to derive the AMF types and to instantiate the AMF entities that will compose the configuration. For each transformation phase, FIG. 3A illustrates the input models (the ETF model 210 and the CR model 220) and the output model (the AMF model 230), as well their referenced meta-models (i.e., the ETF sub-profile 215, the CR sub-profile 225 and the AMF sub-profile 235).

Figure 3B:
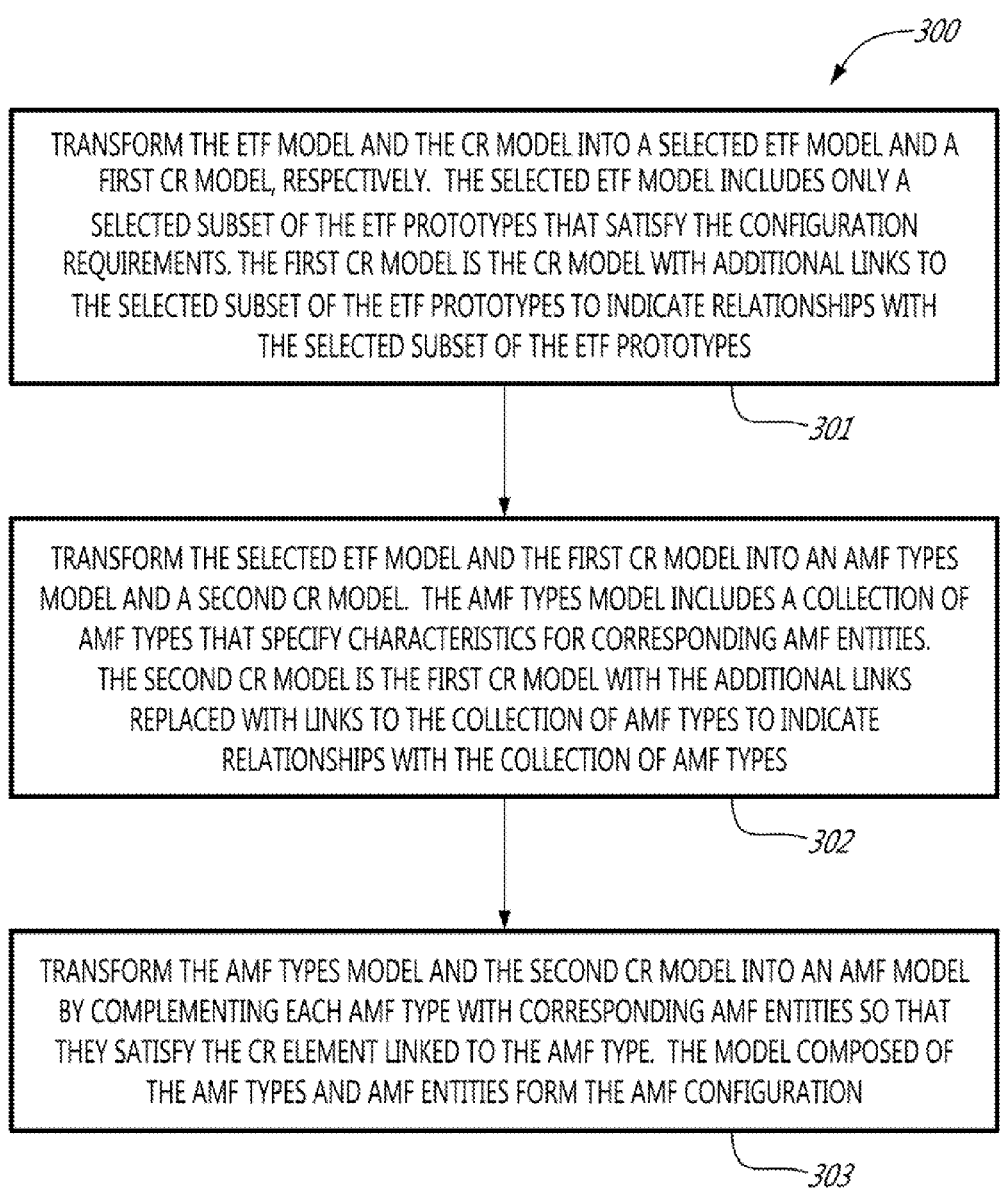
FIG. 3B is a flow diagram illustrating a method of performing the transformation phases of FIG. 3A according to one embodiment of the invention.

FIG. 3B is a flow diagram illustrating a method 300 of a transformation process according to one embodiment of the invention. The method 300 may be performed by hardware (e.g., circuitry, dedicated logic, programmable logic, microcode, etc.), software (e.g., instructions run on a processing device), or a combination thereof. In one embodiment, the method 300 is performed by a computer system 1800 of FIG. 18.

Referring to FIGS. 3A and 3B, in one embodiment, the method 300 begins with a computer system transforming (block 310) the ETF model 210 and the CR model 220 into a selected ETF model and a first CR model 340, respectively (block 301). The selected ETF model includes a selected subset of the ETF prototypes that satisfy the configuration requirements. The first CR model is the CR model with additional links to the selected subset of the ETF prototypes to indicate relationships with the selected subset of the ETF prototypes. Subsequently, the computer system transforms (block 320) the selected ETF model and the first CR model into an AMF Types model and a second CR model 350 (block 302). The AMF Types model includes a collection of AMF Types that describe characteristics for corresponding AMF entities. The second CR model is the first CR model with the additional links replaced with links to the collection of AMF Types to indicate relationships with the collection of AMF Types. Finally, the computer system transforms (block 330) the AMF Types model and the second CR model into the AMF model 230 by complementing each AMF type with corresponding AMF entities so that they satisfy the CR element linked to the AMF type. The model composed of the AMF types and AMF entities form the the AMF configuration (block 303). In one embodiment, the AMF entities including components, component service instances (CSIs), service units (SUs), service instances (SIs), service groups (SGs), and applications.

In one embodiment, the CR model 220 can be processed before starting any of above mentioned transformation phases. This pre-processing activity consists of setting the initial values of the attributes of the CR elements. These attributes can be used in several transformation steps in the transformation phases. A goal of this activity is to determine the expected load of SIs (of each SI template) that an SU of the SG protecting the SIs needs to be able to handle. This is because ETF prototypes may specify capacity limitations of Component Types and SUTypes. The process includes three steps:

A. Calculation of the maximum number of SGs that are allowed to protect the SIs of a particular SG template.

B. Calculation of the number of SIs from each SITemplate that will be assigned to each SG. The calculation is based on the maximum number of SGs calculated in Step A. Step B initializes the value of the attribute expectedSIsperSG.

C. Calculation of the load of SIs that each SU of the SG is supposed to support. The calculation is based on the minimum number of SIs that an SG must handle calculated in Step B. Step C initializes the value of the attributes activeLoadperSU and stdbLoaderperSU.

The above calculation process can be implemented by one or more transformation rules that refine the SITemplate of the CR model.

2.1 ETF Type Selection. An ETF type is also referred to as an ETF prototype. This phase consists of selecting the appropriate entity prototypes from the ETF model, and pruning out the ones that do not satisfy the configuration requirements. The input and output of this transformation phase are instances of the same meta-models; namely, the ETF sub-profile and the CR sub-profile. Therefore, the transformation phase generates an output model which is the refined input model. The output ETF Model contains exclusively the proper selected prototypes, while the CR model in the output enriched with the links to the selected ETF prototypes.

Figure 4A:
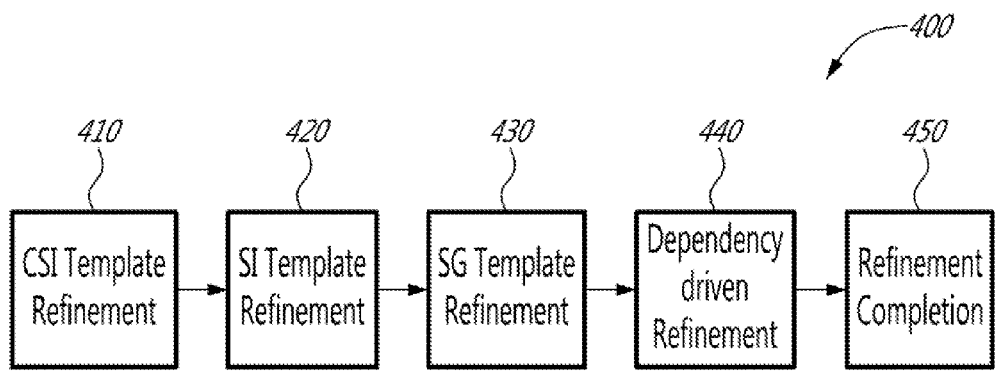
FIG. 4A illustrates transformation steps for an Entity Types File (ETF) model Type selection transformation phase according to one embodiment of the invention.

FIG. 4A illustrates transformation steps 400 for the ETF type selection phase according to one embodiment of the invention. As shown in FIG. 4A, the ETF type selection includes five distinct steps 410-450. The first three steps (410, 420 and 430) bridge the gap between configuration requirements and software descriptions elements. More specifically, they establish the link between the CSITemplates, SITemplates, and SGTemplates on one end, and the appropriate ETF prototypes to be used for the service provision on the other side. The fourth step 440 refines the previously selected ETF prototypes based on the dependency relationships defined at the level of configuration requirements. Finally, the fifth step 450 aims at pruning out unused elements from the analyzed ETF model.

Figure 4B:
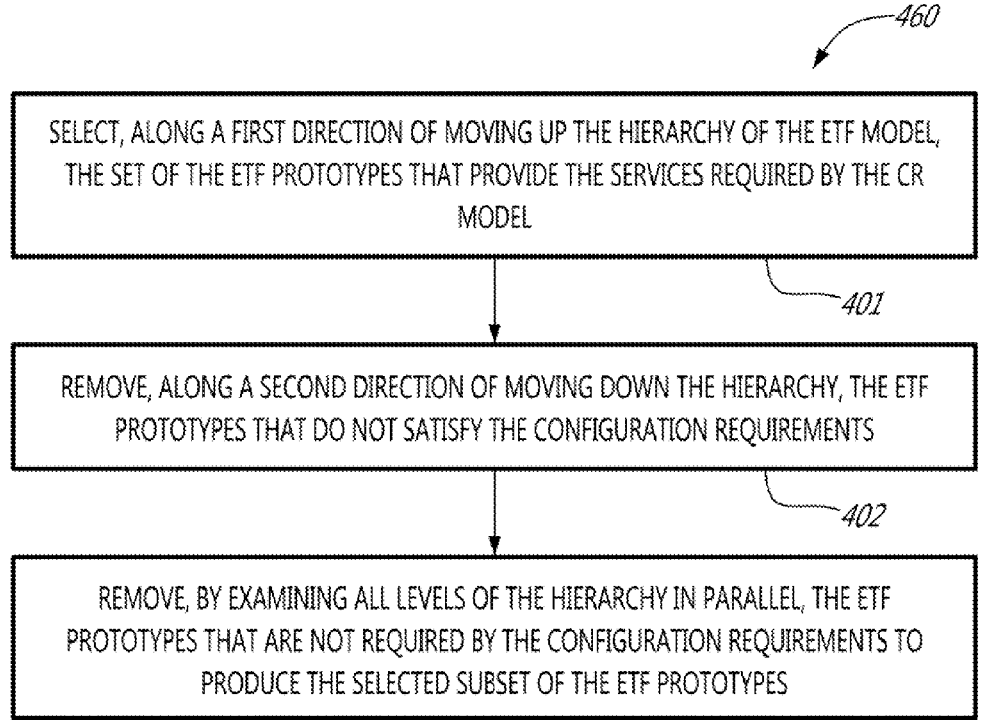
FIG. 4B is a flow diagram illustrating a method of performing ETF Type selection according to one embodiment of the invention.

FIG. 4B is a flow diagram illustrating a method 460 of a transformation process according to one embodiment of the invention. The method 460 may be performed by hardware (e.g., circuitry, dedicated logic, programmable logic, microcode, etc.), software (e.g., instructions run on a processing device), or a combination thereof. In one embodiment, the method 460 is performed by a computer system 1800 of FIG. 18.

Figure 9:
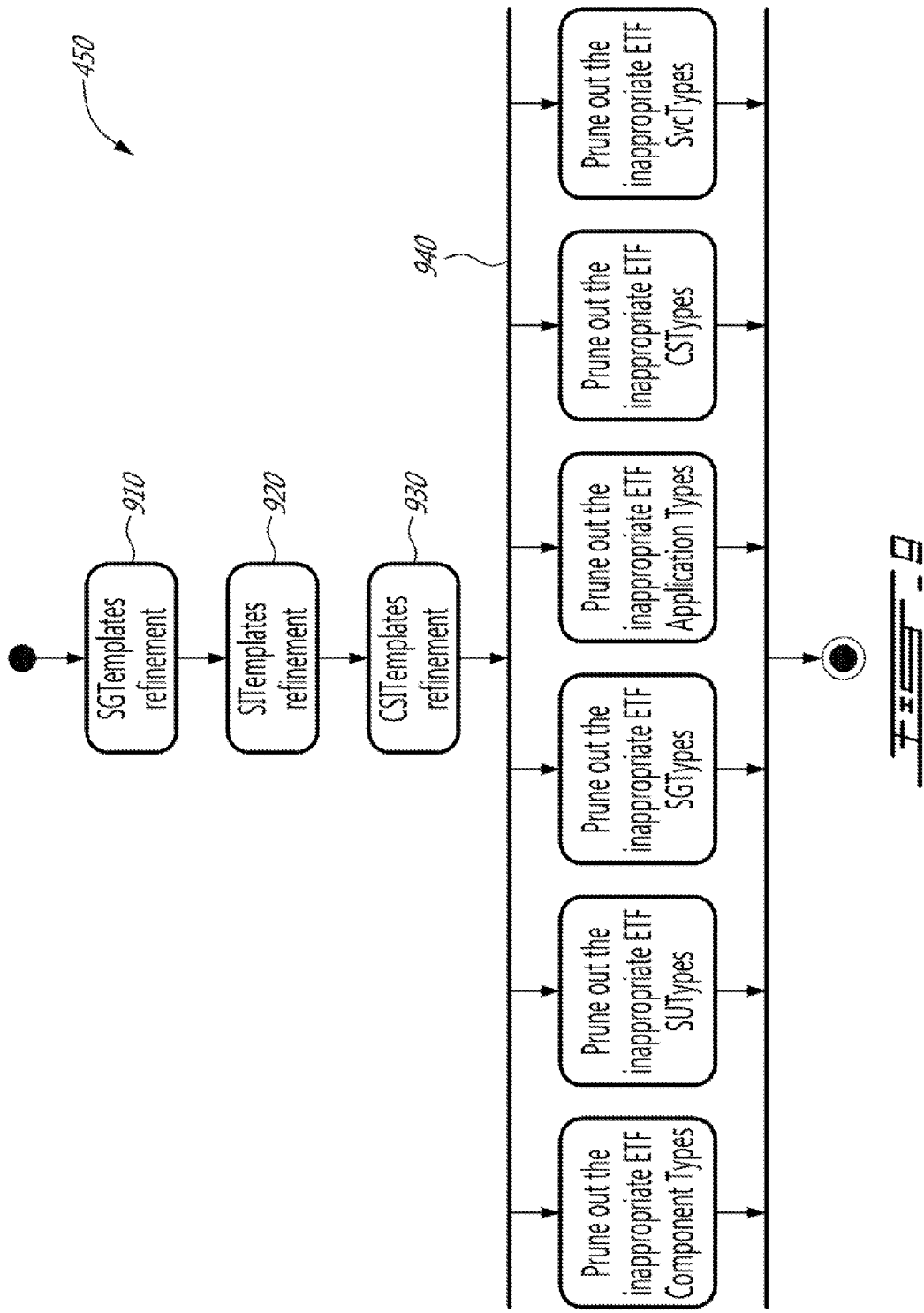
FIG. 9 illustrates additional transformations performed to complete the ETF Type selection transformation phase according to one embodiment of the invention.

Referring to FIG. 4B, in one embodiment, the method 460 begins with a computer system selecting the set of the ETF prototypes that provide the services required by the CR model (block 401). In one embodiment, the selection is made along a direction of moving up the hierarchy of the ETF model (also referred to as the second hierarchy in FIG. 2B). The movement from the bottom toward top of the hierarchy is shown in FIG. 4A as the CSITemplate refinement (block 410), SITemplate refinement (block 420) and SGTemplate refinement (block 430). The CSITemplate, SITemplate and SGTemplate specify the requirements for CSI, SI and SG, respectively, and CSI, SI and SG prototypes form three levels of the hierarchy of the ETF model (from lower to higher levels of the hierarchy). Subsequently, the computer system removes the ETF prototypes that do not satisfy the configuration requirements (block 402). In one embodiment, the removal is made along a direction of moving down the hierarchy of the ETF model (block 402). The movement from the top toward bottom of the hierarchy is shown in FIGS. 4A and 9 as the refinement completion (block 450), which includes SGTemplate refinement (block 910), SITemplate refinement (block 920) and CSITemplate refinement (block 930). Finally, the computer system removes the ETF prototypes that are not required by the configuration requirements to produce the selected subset of the ETF prototypes (block 403). In one embodiment, this final removal is made by examining all levels of the hierarchy in parallel (shown as six parallel pruning operations 940 in FIG. 9). It is understood that additional steps may be involved.

Figure 5:
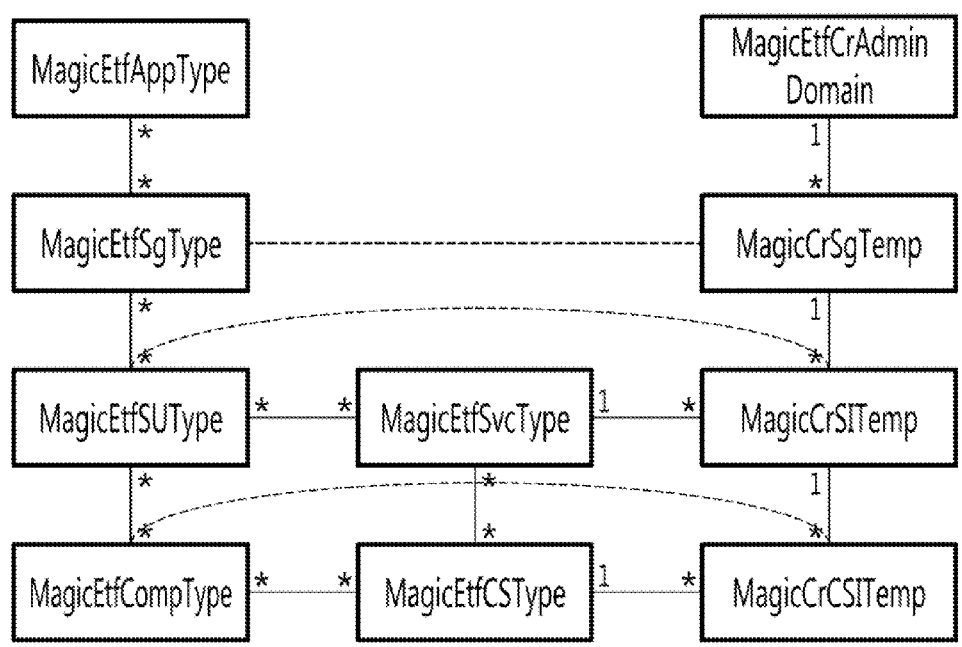
FIG. 5 illustrates results of the ETF Type selection from a meta-model perspective according to one embodiment of the invention.

FIG. 5 illustrates the result of the ETF type selection from the meta-model perspective according to one embodiment of the invention. The dashed connections describe the links defined between elements of the ETF model and of the CR model as the result of this selection phase.

2.1.1 CSITemplate Refinement. The CSITemplate (i.e., CSITemp) refinement includes selecting the Component Types capable of providing the required services described in terms of CSITemplates in the Configuration Requirements. The selection is operated according to the following criteria: 1) the capability of providing the CSType specified by the CSITemplate, 2) the compliance of the Component Type capability model (with respect to the CSType) with the redundancy model specified by the parent SGTemplate, 3) the number of components of the Component Type that can be included in an SU and the load of assignments required to be supported by such an SU, and 4) the compliance of the redundancy model specified by parent SGType prototype of the component type with the required redundancy model (specified in the parent SGTemplate).

Figure 6:
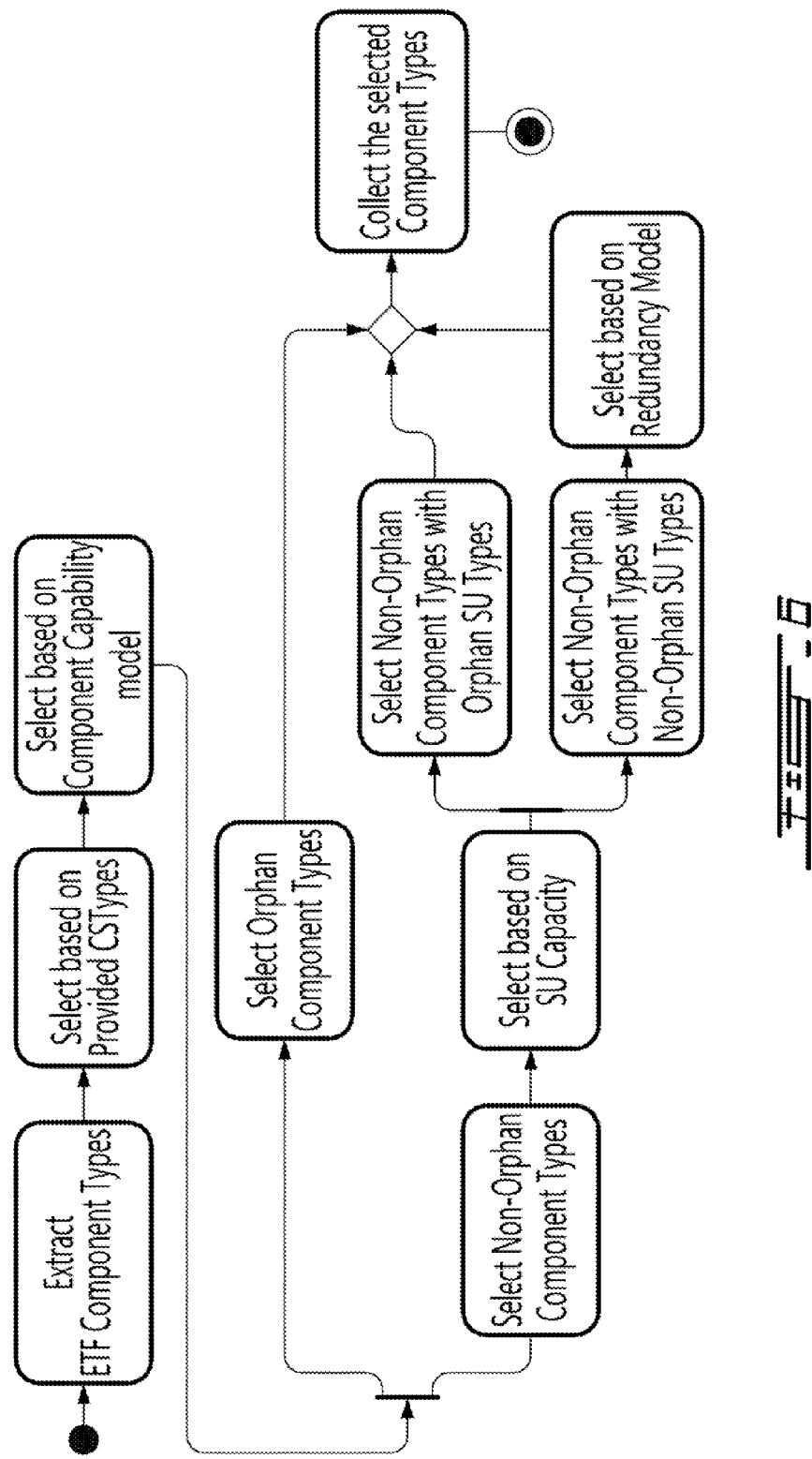
FIG. 6 illustrates an activity diagram describing a process of selecting ETF Component Types according to one embodiment of the invention.

The first two criteria are general and are checked for all component types of the ETF model. The third one is checked for the component types that have at least one parent SUType in the ETF model, referred to as non-orphan component types. The last criterion is applied if the parent SUType has at least one parent SGType in the ETF model. FIG. 6 is a UML activity diagram illustrating an embodiment of a CSITemplate refinement process in which ETF component types are selected. This diagram represents the control flow which regulates the usage of each selection criterion.

The component type selection requires visiting both input models (i.e., the configuration requirements model and the ETF model), with the aim to identify the proper Component Types for CSITemplates. The refinement consists of specifying the link between CSITemplates and the Component Types. The refinement process can be implemented by a transformation rule CompTypeSelection, which can be coded in ATL.

```
rule CompTypeSelection {
  from s: MagicCRProfile!MagicCrCsiTemplate
  to t: MagicCRProfile!MagicCrCsiTemplate(properEtfCt<-
  properCtFinder( ))
}
```

The above code describes the transformation rule that finds the proper Component Types for each CSITemplate. The rule uses the properCtFinder helper function which implements the CSITemplate refinement process. This helper function identifies the set of Component Types which satisfy the above mentioned criteria.

The rule is executed for all instances of the CSITemplates of the configuration requirements model. The execution of this rule results in selecting the set of proper component prototypes for each CSITemplates. However, the sets identified during this transformation step do not necessarily represent the proper set that will be used to support the generation. They will be further refined based on additional criteria introduced in the next transformation steps.

Criterion 1: Provided CSType. Each CSITemplate specifies the CSType that identifies the type of the CSI that needs to be provided, as well as the number of CSIs. For each Component Type it is required to evaluate whether the Component Type can provide the required CSType. More specifically, this can be done comparing each required CSType with the list of CSTypes that can be provided by the Component Type. A first part of the properCtFinder helper function selects the proper Component Types based on the supported CSTypes.

Criterion 2: Component Capability Model. The component capability model of the selected Component Type must conform to the required redundancy model. The capability model specifies the capacity of the Component Type in terms of the number of active and/or standby CSI assignments (of the given CSType) that a component of that type can support. As specified in AMF sub-profile, applying different redundancy models imposes different constraints on the capability model. The redundancy model is specified by the SGTemplate. A second part of the properCtFinder helper function imposes the constraint of a given redundancy model.

Criterion 3: Number of supported components by the SUType and SU Capacity. If the selected Component Types has a parent SUType, it is required to take into consideration the number of components of the Component Type that can be included in an SU. More specifically, the number of Components of this Component Type in an SU has to be capable of supporting the load of CSIs of the particular CSType.

In one embodiment, the load of active/standby assignments required by the CSITemplate is related to the one of the parent SITemplate. The number of SI assignments that should be supported by a SU that aggregates Components of the selected Component Types depends on the redundancy model specified in the CR model. The maximum load of CSIs that should be supported by such an SU is the product of the SI load and the number of CSIs specified by the current CSITemplate.

The required services can be provided by entities (e.g., software or hardware entities). Therefore, it is necessary to check the capacity of Component Types and SUTypes with respect to the number of possible active/standby assignments they can provide. More specifically, it is necessary to find the maximum number CSIs of a CSType that can be provided by the Components aggregated in an SU. The ETF specifies the maximum number of components of a particular Component Type that can be aggregated into the SUs of a given SUType (magicEtfMaxNumInstances). In addition, for each Component Type, the ETF also specifies the maximum number of CSIs active/standby assignments of each supported CSType (magicEtfMaxNumActiveCsi and magicEtfMaxNumStandbyCsi). As a result, the active/standby capacity of SUs of a given SUType in handling assignments of CSIs of a given CSType is the product of magicEtfMaxNumInstances and magicEtfMaxNumActiveCsi/magicEtfMaxNumStandbyCsi.

As a consequence, a Component Type aggregated into a given SUType can be selected only if its provided capacity can handle the load associated with the CSType of the CSITemplate. A third part of the properCtFinder helper function selects Component Type capable of supporting the required active and standby load. In the helper function, the calculation of the load is based on the activeLoaderpSU/ stdbLoaderpSU attributes of the SITemplates, which aggregate the CISTemplates that require the same CSType, as well as the number of the CSIs of these CSITemplates.

Criterion 4: Redundancy model. If the parent SUType of the Component Type has a parent SGType, the redundancy model of the SGType has to match the one specified in the SGTemplate which contains the current CSITemplate. The fourth part of the properCtFinder helper function verifies the compliance of the redundancy model specified in the parent SGTemplate.

At the end of this step and after considering all above mentioned criteria, if the set of Component Types selected is an empty set, the analyzed ETF model cannot satisfy the configuration requirements and therefore the configuration cannot be designed. Otherwise, the refinement process moves the focus from the level of selecting Component Types for CSITemplates, to finding the proper SUTypes for SITemplates referred to as SITemplate refinement.

2.1.2 SITemplate Refinement. The SITemplate (i.e., SITemp) refinement includes selecting the SUTypes of the ETF model capable of providing the services required by the SITemplates specified in the CR model. The selection process in this step is similar to the one defined in the CSITemplate refinement. In this step the ETF model is further refined with respect to the properties required by the SITemplates and base on the following criteria: 1) the capability of providing the SvcType specified by the SITemplates aggregated by the SGTemplate of the current SITemplate, 2) the compliance of the redundancy model specified by parent SGType prototype of the SUType with the required redundancy model of SITemplate (specified in the parent SGTemplate), and 3) the existence of links (resulting from the CSITemp refinement) between Component Types of the SUType and CSITemplates of the SITemplate.

Figures 7, 8:
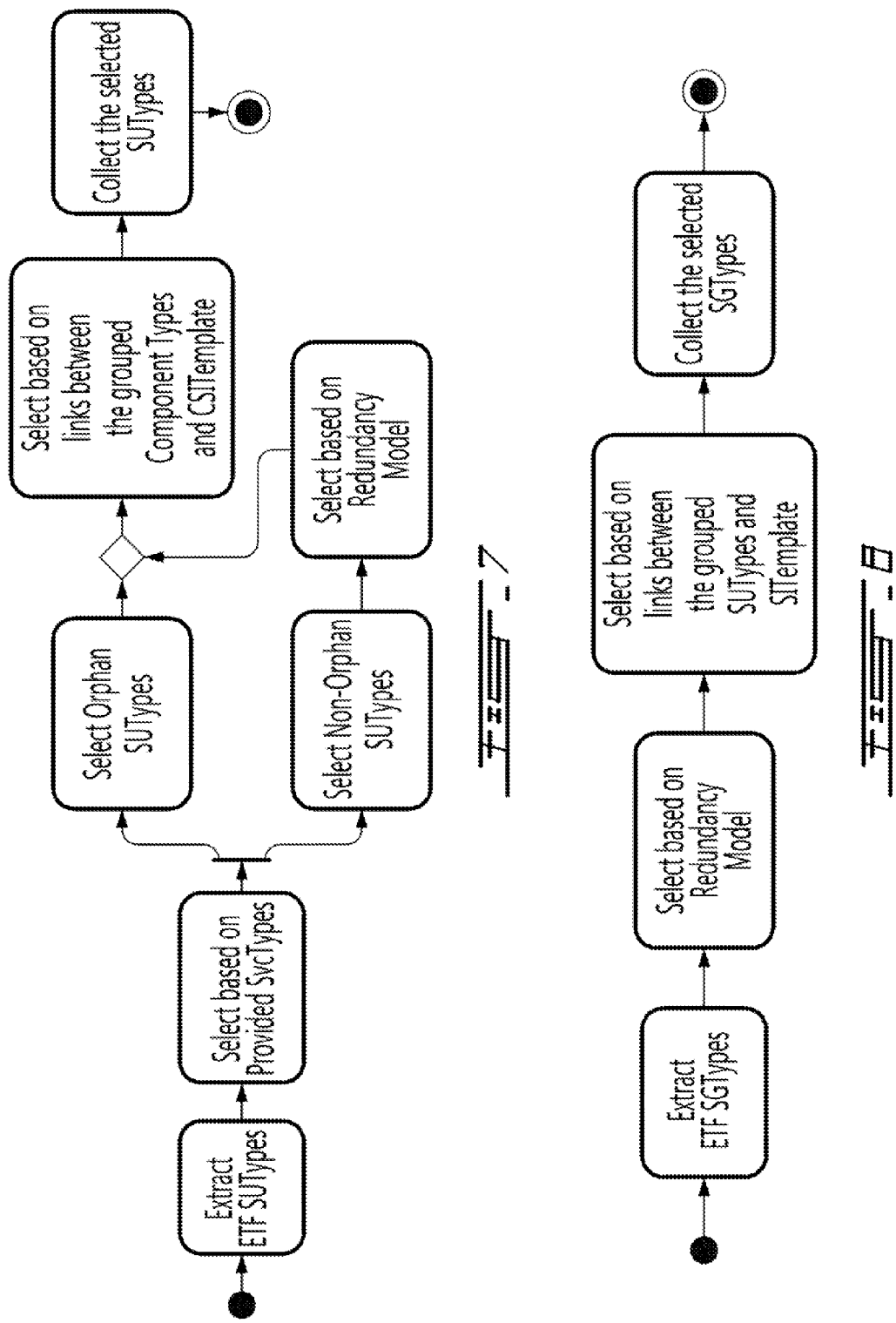
FIG. 7 illustrates an activity diagram describing a process of selecting ETF SUTypes according to one embodiment of the invention.
FIG. 8 illustrates an activity diagram describing a process of selecting ETF SGTypes according to one embodiment of the invention.

FIG. 7 is a UML activity diagram illustrating an embodiment of an SITemplate refinement in during which ETF SUTypes are selected base on these mentioned criteria. The refinement process can be implemented by a transformation rule SUTypeSelection, which can be coded in ATL.

```
rule SUTypeSelection {
    from s: MagicCRProfile!MagicCrRegularSiTemplate
    to t: MagicCRProfile!MagicCrRegularSiTemplate(properEtfSUT<-properSUTFinder( ))
}
```

This rule defines the link between the SITemplates and the selected SUTypes by using the properSUTFinder helper function which implements the previously mentioned criteria.

Criterion 1: Provided SvcType. Each SITemplate specifies the SvcType that identifies the type of the SIs that needs to be provided, as well as the number of SIs. For each SUType it is evaluated whether the SUType can provide the required SvcType of the SITemplates of the parent SGTemplate. More specifically, this can be done comparing SvcTypes with the list of SvcTypes that can be provided by the SUType. A first part of the properSUTFinder helper function selects the proper SUTypes based on the supported SvcTypes.

Criterion 2: Redundancy Model. If the SUType has a parent SGType, the redundancy model of the SGType has to match the one specified in the SGTemplate which contains the current SITemplate. A second part of properSUTFinder helper function verifies the compliance of the redundancy model specified in the parent SGTemplate.

Criterion 3: Links of grouped Component Types. In order to select an SUType for an SITemplate, the SUType should group all the Component Types which are required by the CSITemplates of the given SITemplate. In other words, for each of the CSITemplates of the SITemplate at least one of the Component Types of the SUType must have the link to that CSITemplate. A third part of properSUTFinder helper function is developed to satisfy this criterion.

2.1.3 SGTemplate Refinement. The SGTemplate (i.e., SGTemp) refinement includes selecting the SGTypes of the ETF model capable of providing the services required by the SGTemplates specified in the CR model. The selection is based on the following criteria: 1) the compliance of the redundancy model specified by SGType prototype with the required redundancy model in SGTemplate, and 2) at least one SUType of the SGType has to provide all the SvcTypes associated with the SITemplates grouped in the SGTemplate.

FIG. 8 is a UML activity diagram illustrating an SGTemplate refinement process in which SGTypes are selected base on these mentioned criteria. The refinement process can be implemented by a transformation rule SGTypeSelection, which can be coded in ATL.

```
rule SGTypeSelection {
    from s: MagicCRProfile! MagicCrSgTemplate
    to t: MagicCRProfile! MagicCrSgTemplate(properEtfSGT<-properSGTFinder( ))
}
```

Based on these criteria the SGTypeSelection defines the link between the SGTemplates and the selected SGTypes. It invokes the properSGTFinder helper function which performs the process specified in FIG. 8.

Criterion 1: Redundancy Model. The redundancy model of the SGType has to match the one specified in the SGTemplate. A first part of properSGTFinder verifies the compliance of the redundancy model specified in the SGTemplate.

Criterion 2: Links of grouped SUTypes. In order to select an SGType for an SGTemplate, the SGType should group at least one SUType, which has been selected by all the SITemplates of the given SGTemplate. In other words, this SUType is capable of providing each of the SvcType associated with the SITemplates aggregated in the SGTemplate. A second part of properSGTFinder is developed to satisfy this criterion.

2.1.4 Dependency Driven Refinement. This step takes into account the dependency relationships that exist both among configuration requirements elements and among ETF model elements. In the configuration requirements model the dependency relationships are defined between CSITemplates and between SITemplates. In the ETF model, the dependency relationships are specified between the Component Types in providing CSTypes and between SUTypes in providing SvcTypes. The objective of this step is to refine the previously selected ETF prototypes based on the dependency relationships defined at the level of configuration requirements. More specifically, all ETF prototypes that do not respect the dependency requirements need to be pruned out form the set of selected prototypes.

The dependency driven refinement includes two different activities: 1) refinement of the set of proper Component Types for each CSITemplate, and 2) refinement of the set of appropriate SUTypes for each SITemplate.

2.1.4.1 Component Type Dependency Driven Refinement. The first activity aims at refining the set of Component Types selected as a result of previous step based on the dependency relationships. The refined set of Component Types needs to be compliant with the configuration requirements from the dependency point of view. To this end, this refinement activity takes into account the following scenario for each CSITemplate:

In case the CSITemplate does not specify any dependency relationship to other CSITemplates, the proper Component Types for the CSITemplate should not have any dependency in providing the required CSType.

The first activity is described in terms of a refinement transformation of CSItemplates. The transformation is enabled for each CSITemplate in the CR model which do not specify any dependency relationship.

The refinement consists of updating the set of properCt by including in this set only those Component Types that do not specify any dependency in providing the CSType associated with the CSITemplate. This refinement takes into account the dependency relationship in both directions. More specifically, it considers both the case in which a CompType depends on other CompTypes in providing a CSType, and the case in which a given CompType in providing a CSType depended on by other CompTypes.

These two cases can be implemented by two transformation rules. The transformation rules can be coded in ATL. The first rule extracts from the set of previously selected Component Types of a given CSITemplate those that do not depend on any other component types in providing the associated CSType. The second rule refines the set of proper Component Types of a given CSITemplate by selecting the ones that do not depend on by any other Component Types.

2.1.4.2 SUType Dependency driven Refinement. This activity aims at refining the set of SUTypes selected as a result of previous step based on the dependency relationships. The refined set of SUTypes needs to be compliant with the configuration requirements from the dependency point of view. To this end, this refinement activity takes into account the following scenario for each SITemplate:

In case the SITemplate does not specify any dependency relationship to other SITemplates, the proper SUTypes for the SITemplate should not have any dependency in providing the required SvcType.

The first activity is the refinement transformation of SITemplates. The transformation is executed for each SITemplate which do not specify any dependency relationship. The refinement includes selecting from the set of properSUTtheSUTypes that do not specify any dependency on other SvcTypes in providing the SvcType associated with the SITemplate. This transformation can be implemented by a transformation rule coded in ATL.

2.1.5 Completing the refinement. The previously selected ETF prototypes represent the software resources that can be used to design an AMF configuration which satisfies the configuration requirements. As previously mentioned, the proper sets identified at the end of each selection step need to be further refined since they may contain prototypes which are inappropriate to be used for generation purposes. More specifically the previously mentioned criteria consider each selected entity prototype as independent from the other identified prototypes. For example, a selected ETF Component Type is aggregated by an ETF SUType which has not been selected during the SUType refinement step. That Component Type cannot be used for generation purposes and thus has to be removed from the selected sets. This transformation phase is completed by pruning out the unselected irrelevant prototypes from the ETF model. This refinement activity results in the sets of prototypes that will be used for the subsequent phases of the transformation.

FIG. 9 illustrates the different activities that characterize the completion of the refinement according to embodiments of the invention. More specifically, the transformation starts refining the selected set of ETF prototypes linked by each Configuration Requirements element. Afterwards, it forwards the appropriate ETF prototypes to the next phase pruning out the unselected ones from the ETF model.

2.1.5.1 Configuration Requirements Refinement. In this step the CR model is transformed refining the list of proper ETF prototypes. The step is characterized by three different transformations: SGTemplates refinement (block 910), SITemplates refinement (block 920) and CSITemplates refinement (block 930).

The SGTemplate elements and their previously defined links to the ETF prototypes are forwarded to next phase of the transformation without any change.

The SITemplate elements are refined modifying the associated list of proper SUTypes by means of SItempRefinement transformation rule. This rule prunes the irrelevant SUTypes from the preliminary selected set. More specifically, an SUType will result in the final set of selected SUTypes: 1) if it is not aggregated by any SGType, or 2) if it is aggregated by an SGType and the SGType is in the set of selected SGTypes of the SGTemplate associated with the current SITemplate.

Afterwards, CSITemplate elements are transformed updating the list of proper Component Types. The inappropriate Component Types are pruned out from the list based on criteria similar to the ones used for SITemplate. More specifically, a Component Type will result in the proper selected set: 1) if it is not aggregated by any SUType, or 2) if it is aggregated by an SUType and the SUType is in the set of selected SUTypes of the SITemplate associated with the current CSITemplate.

2.1.5.2 ETF Prototype Refinement. In this step (940), the ETF prototype model is transformed pruning out the inappropriate prototypes from the current ETF model. The refinement is operated based on the previously selected and refined set of proper prototypes linked by the Configuration Requirements elements. The refinement includes: Component Types pruning, SUType pruning, SGType pruning, Application Type pruning, SvcType pruning, and CSType pruning. These pruning operations are mechanical delete operations of the elements unselected in the first three sequential blocks (910-930). Therefore, for example, the six pruning operating (940) can be executed in parallel.

2.2 AMF Entity Type Creation. Referring again to FIG. 3A, the second phase of the transformation process 300 is AMF entity type creation (block 320). This phase includes generating the AMF entity types (also referred to as AMF Types) to be used for the AMF configuration design. One main objective of this phase is to define the AMF entity types (derived from corresponding selected entity prototypes) that can be used to specify one possible configuration which satisfies the Configuration Requirements.

In the embodiment shown in FIG. 3A, this transformation phase 320 takes as input the ETF-model refined by the previous transformation phase (the ETF type selection 310). The transformation phase 320 creates and configures AMF entity types based on the selected ETF prototypes. It also creates the links between AMF entity types and Configuration Requirements considering the possible relationships that exists between the ETF prototypes and CSITemplates, SITemplates, or SGTemplates. More specifically, these links substitute the links between ETF prototypes and templates resulting from the previous transformation phase 310. For example, an AMF Component Type can be created based on a selected Component prototype in the selected (refined) ETF model. In addition, the generated AMF Component Type is linked to the CSITemplate, which was connected to the selected ETF Component prototype, i.e. the CSITemplate for which the Component prototype has been selected.

Figure 10:
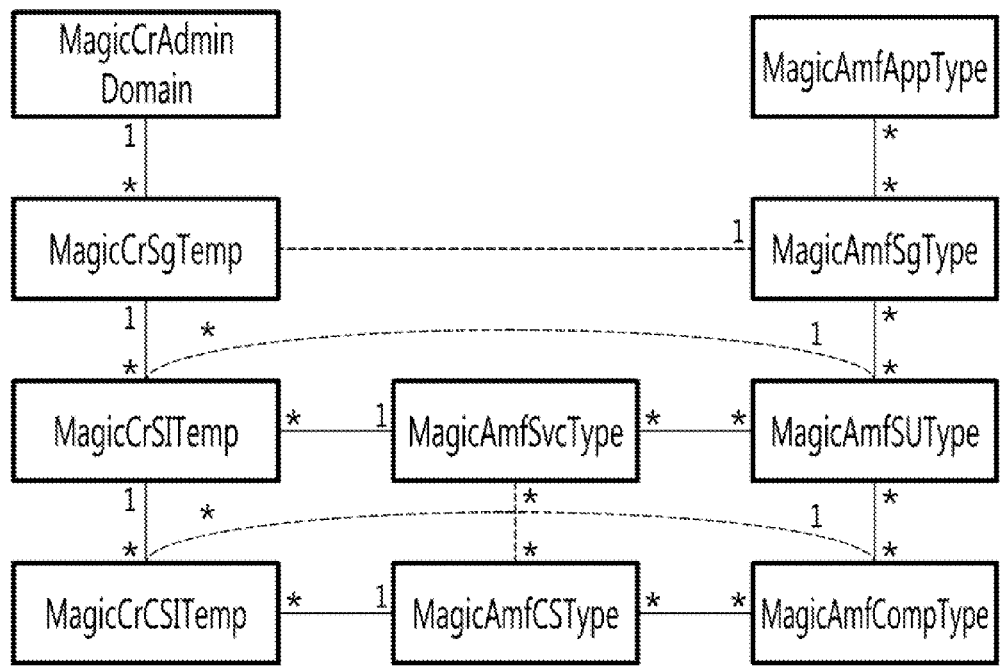
FIG. 10 illustrates a result of the AMF entity type creation phase from a meta-model perspective according to one embodiment of the invention.

FIG. 10 is a diagram illustrating the output generated at the end of this phase from the meta-model perspective according to one embodiment of the invention. The dashed connections describe the links defined between the generated AMF entity types and the elements of Configuration Requirements as well as the relationships among the AMF entity types.

Figure 11:
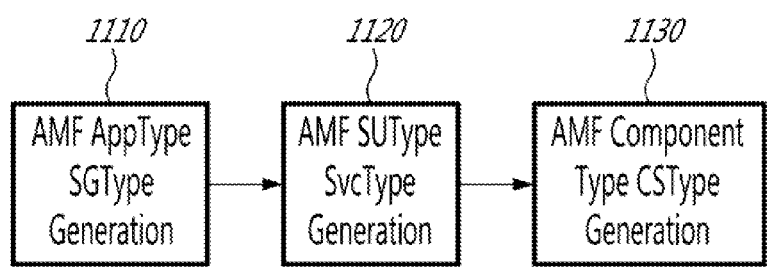
FIG. 11 illustrates transformation steps of an AMF entity type creation phase according to one embodiment of the invention.

FIG. 11 is a diagram illustrating a transformation process 1100 including three transformation steps 1110, 1120 and 1130 of the AMF entity type creation phase. Each step corresponds to a different transformation that generates particular AMF entity types starting from the corresponding previously selected ETF prototypes. However, the only mandatory elements in an ETF model are Component Types and CSTypes. Therefore, SUTypes, SGTypes, AppTypes and SvcTypes might not exist in the ETF model. The refinement phase described in the ETF type selection does not aim at modifying the ETF model by completing the definition of the missing prototypes. In other words, it is possible to have prototypes that are not aggregated into other prototypes according to the hierarchical structure specified by the ETF model. For example, ETF Component Types may not be aggregated by any ETF SUType, or ETF CSTypes are not necessarily aggregated into an ETF SvcType. Although missing prototypes are tolerated in ETF models, in order to generate an AMF configuration it is required to have the complete hierarchy of types. Therefore, to complete the hierarchy, the transformation process 1100 builds AMF entity types based on a set of existing prototypes. For the previously mentioned example, it is necessary to create an AMF SUType based on the existing ETF Component Types as well as the AMF SvcTypes based on the existing ETF CSTypes.

In one embodiment, the transformation process 1100 creates AMF entity types that are directly derived from existing ETF prototypes, as well as the AMF entity types that do not have any ETF prototype counterpart. In addition to generating the proper AMF types, these transformation steps also establish the required relationships among them.

For the creation of the AMF entity types based on the existing ETF prototypes, the generated AMF entity types are characterized by a set of attributes that directly corresponds to the properties defined in ETF prototypes. Generally, the properties specified in ETF prototypes impose restrictions on corresponding AMF entity types attributes. For instance, they can specify the admissible range of values that can be defined for each attribute. For the sake of simplicity, the values defined in ETF prototypes are assigned to these attributes in the AMF entity types in a way that they satisfy the requirements of the associated CR elements. In case of attributes optional in the ETF prototypes, which therefore are not specified in the ETF model, but may be mandatory for the AMF entity types, these attributes can be created without any initial value. They need to be post-processed, for example, to tailor them to a particular deployment site.

In order to generate AMF entity types that do not have any ETF counterpart, the generated AMF entity types are characterized by a set of attributes which are initialized with the information described in configuration requirement elements (e.g. redundancy model which is specified in the SGTemplate). Moreover, in case of attributes without any value, the attribute values can be initialized according the default values indicated in the AMF specification.

2.2.1 AMF SGType and AppType Generation. As previously mentioned, SGTypes and Application Types are not mandatory elements of an ETF models. Moreover, there is no element in the configuration requirement model that directly links to the Application Types. Therefore, the generation of both AMF SGTypes and AppTypes will be performed starting from SGTemplate and based on the set of selected SGTypes of that template. In one embodiment, the generation is implemented using three different transformations:

A. If the list of selected ETF SGTypes is empty, an AMF SGType and a parent AMF AppType is created from scratch.

B. If the list of selected ETF SGTypes consists of only orphan SGTypes, one of the selected ETF SGTypes is transformed and the parent AMF AppType is created from scratch.

C. If the list of selected ETF SGTypes consists of at least one non-orphan SGType, one of the non-orphan SGTypes and one of its parent AppTypes are transformed.

The first transformation (A) is rather straightforward and can be performed by means of a single ATL rule called AMF-SGType_AppTypeCreate. For a given SGTemplate, this rule is executed if the list of the proper ETF SGTypes is empty, indicating that there is not an appropriate SGType in the ETF model for this SGTemplate. The rule consists of three different parts (t1, t2 and t3): t1 creates an AMF SGType and t2 generates the AMF AppType. Moreover, the link between the created AMF SGType and AppType is also established in t1 and t2. Finally, t3 creates the link to the generated AMF SGType.

The second transformation (B) is performed by means of Oraphan_AMFSGType_AppTypeCreate rule and AMFSGTypeTransform unique lazy rule. For a given SGTemplate, Oraphan_AMFSGType_AppTypeCreate is executed when the all selected ETF SGTypes are orphan. In this rule t1 creates an AMF AppType and generates the link to an AMF SGType transformed from the first selected ETF SGType. This ETF SGType is transformed using the AMFSGTypeTransform rule. Moreover, t2 updates the SGTemplate with the newly created AMF SGType. Additionally, t2 also replaces the list of proper ETF SGTypes with the ETF SGType which is transformed to the AMF SGType (This list will be used in next steps).

The third transformation (C) is executed if at least one of the selected ETF SGTypes of a given SGTemplate is non-orphan. The transformation can be performed mainly by an ATL rule called Non_Oraphan_AMFSGType_AppTypeCreate. This rule transforms one of the non-orphan selected ETF SGTypes to an AMF SGTypes using AMFSGTypeTransform unique lazy rule and creates a link from the SGTemplate to the created AMF SGType. It also replaces the list of proper ETF SGTypes with the ETF SGType which is transformed to the AMF SGType (this list will be used in next steps). Moreover, by using AMFAppTypeTransform unique lazy rule, Non_Oraphan_AMFSGType_AppTypeCreate transforms one of the ETF AppTypes that aggregates the transformed ETF SGType to an AMF AppType.

2.2.2 AMF SUType and SvcType Generation. Similar to SGTypes and AppTypes, SUTypes and SvcTypes are not mandatory elements of an ETF models. However, since we assumed that the CR model is complete, the SvcTypes are already specified in this model. Therefore, different generation strategies need to be defined according to the existence of the SUTypes in the ETF model. As a consequence, this generation step consists of three different transformations.

A. Generation of the AMF SUTypes and SvcTypes from the selected matching non-orphan ETF SUTypes and the related ETF SvcType.

B. Generation of the AMF SUTypes and SvcTypes from the selected matching orphan ETF SUType and the related ETF SvcType.

C. Creation of the AMF SUTypes from scratch as well as the creation of the AMF SvcTypes based on the corresponding ETF prototypes. This transformation covers the case in which the corresponding ETF SUTypes are missing in the selected ETF model.

The first transformation (A) generates AMF SvcTypes and AMF SUTypes for a given SITemplate starting from the corresponding ETF SvcType and non-orphan ETF SUTypes selected in the previous step. The transformation is implemented using the Non_Orphan_AMFSUType_SvctTransform rule and the unique lazy rules AMFSUTypeTransform and AMFSvctTransform. The rules also establish the relationships among the generated AMF types. Moreover, the lazy rules generate AMF types that capture all the characteristics of the related prototypes in a way that they satisfy the configuration requirements.

For a given SITemplate, Non_Orphan_AMFSUType_SvctTransform refines the current SITemplate and targets the generation of AMF SvcTypes and SUTypes and their relationships. The rule is executed only if any of the selected SUTypes is not an orphan. Thereafter, the rule transforms the ETF SUType which is supported by the SGType transformed for the aggregating SGTemplate in previous step. This transformation is performed by calling the AMFSUTypeTransform. AMFSUTypeTransform targets the generation of AMF SUTypes and the attributes based on the corresponding ETF prototypes. The list of proper ETF SUTypes is also replaced with the ETF SUType which is transformed to the AMF SUType (This list will be used in next steps).

The second transformation (B) generates AMF SvcTypes and AMF SUTypes for a given SITemplate starting from the corresponding ETF SvcType and orphan ETF SUTypes selected in the previous phase. This transformation is implemented using the Orphan_AMFSUType_SvctTransform rule and the unique lazy rules AMFSUTypeTransform and AMFSvctTransform similar to the first transformation.

For a given SITemplate, Orphan_AMFSUType_SvctTransform refines the current SITemplate and targets the generation of AMF SvcTypes and SUTypes and their relationship. The rule is executed only if all selected SUTypes are orphan. This also implies that the SGTemplate of the current SITemplate was created from scratch in the previous step. Consequently, the rule transforms from the selected ETF SUTypes one which has been selected for all SITemplates of the parent SITemplate. The transformation is done by calling the AMFSUTypeTransform. AMFSUTypeTransform targets the generation of AMF SUTypes and the attributes based on the corresponding ETF prototypes and the configuration requirements. The list of proper ETF SUTypes is also replaced with the ETF SUType which is transformed to the AMF SUType (This list will be used in next steps). Finally, AMFSvctTransform generates the SvcType associated with the current SITemplate.

In one embodiment, the above-presented rules (Non_Orphan_AMFSUType_SvctTransform, Orphan_AMFSUType_SvctTransform, AMFSUTypeTransform, and AMFSvctTransform) aim at generating AMF types from the existing corresponding ETF prototypes. However, if the selection phase could not find any appropriate SUType for the given SITemplate, the proper SUType needs to be created from scratch.

The AMFSUType_SvctCreate rule creates AMF SUTypes from scratch and the AMF SvcTypes based on the corresponding ETF prototypes. In AMFSUType_SvctCreate for a given SITemplate, the firing condition checks the existence of an ETF SUType in list of selected SUTypes (properEtfSUT). The rule targets the creation of different AMF entity types and the relationship among them. For each created entity type the transformation initializes the attributes to their default value specified in AMF specification unless the SITemplate requires otherwise, in which case the value required by the SITemplate is used. More specifically, the rule includes a link between the SITemplates and the newly created SUTypes (from scratch) and SvcType generated by the createSUTfromScratch helper function and the lazy rule AMFSvctTransform, respectively.

AMFSvctTransform creates the appropriate AMF SvcType for the associated ETF prototype linked to the SITemplates. The helper function createSUTfromScratch returns the proper AMF SUType capable of providing all the SvcTypes referred by the set of SITemplates grouped by the SGTemplate. The function checks whether an SUType with such characteristics has already been defined in the AMF model. In this case it returns this type; otherwise it creates an SUType from scratch and returns it. Finally, AMFSUType_SvctCreate establishes the connection between the newly created SvcType and the SUTypes returned by the helper function.

2.2.3 AMF Component Type and CSType Generation. AMF Component Types and AMF CSTypes for a given CSITemplate are generated starting from the previously selected ETF prototypes. These generated types capture the characteristics of the referenced prototypes.

The creation targets several elements: namely, the CSType associated with the current CSITemplate, the proper Component Types, the association class that links AMF Component Types to the CSTypes, the association class that links AMF Component Types to the SUTypes generated in the previous step, the association class that links CSType to the SvcType of aggregating SITemplate as well as the link between CSITemplates and the created entity types. For this purpose, two main transformations are defined in order to cover the following cases:

A. Generation of the AMF Component Types and CSTypes from the selected matching non-orphan ETF Component Types and the related ETF CSType as well as the generation of the association classes between AMF entity types generated both in this step and in the previous step (section 2.2.2. AMF SUType and SvcType Generation).

B. Generation of the AMF Component Types and CSTypes from the selected matching orphan ETF Component Types and the related ETF CSType as well as the generation of the association classes between AMF entity types generated both in this step and in the previous step (section 2.2.2. AMF SUType and SvcType Generation).

The generation process for both above mentioned cases is directly illustrated by means of the transformation rule Non_Orphan_AMFCompType_CSTypeTransform and Orphan_AMFCompType_CSTypeTransform as well as the required unique lazy rules namely AMFCompTypeTransform( ) and AMFCSTypeTransform( ).

Non_Orphan_AMFCompType_CSTypeTransform refines a given CSITemplate and targets the generation of AMF CSTypes and Component Types and their relationship. The rule is executed only if any of the selected Component Types is not an orphan. Afterwards, the rule transforms the ETF Component Type which is supported by the SUType which is transformed for the aggregating SITemplate in previous step. This transformation is performed by calling the AMFCompTypeTransform. AMFCompTypeTransform targets the generation of AMF Component Types and the attributes based on the corresponding ETF prototypes and the configuration requirements. Moreover, AMFCSTypeTransform generates the CSType associated with the current CSITemplate and initializes its attributes with the attributed specified by the corresponding prototype.

The rule Non_Orphan_AMFCompType_CSType-Transform includes four parts (t1, t2, t3 and t4): t1 creates the association class (MagicSaAmfCtCSType) between the AMF Component Type and CSType by calling the unique lazy rules, t2 generates the relationship (MagicSaAmfSvcTypeC-SType) between the newly created AMF CSType and its parent SvcType created in the previous step, t3 establishes the link (MagicSaAmfSutCompType) between the newly generated AMF Component Type and its parent SUType created in the previous step, and, finally, t4 updates the CSITemplate with the list of AMF Component Types.

Similarly Orphan_AMFCompType_CSTypeTransform refines a given CSITemplate and targets the generation of AMF CSTypes and Component Types and their relationship. This rule is executed only if all selected Component Types are orphan for the CSITemplate as well as for the parent SITemplate and its peer SITemplates within their parent SGTemplate. If so the rule simply transforms the first ETF Component Type selected for the current CSITemplate and the corresponding CSType to AMF Component Type and AMF CSType respectively. This transformation is performed by calling the AMFCompTypeTransform. AMFCompType-Transform targets the generation of AMF Component Types and the attributes based on the corresponding ETF prototypes. Moreover, AMFCSTypeTransform generates the CSType associated with the current CSITemplate and initializes its attributes with the attributed specified by the corresponding prototype.

The rule Orphan_AMFCompType_CSTypeTransform includes four parts (t1, t2, t3 and t4): t1, t2, and t3 create the required association classes, namely MagicSaAmfCtCSType, MagicSaAmfSvcTypeCSType, and MagicSaAmfSutCompType, between the newly generated AMF Types and the related created elements from the previous step. Finally, updating the CSITemplate with the list of AMF Component Types is performed by t4.

2.3. AMF entity creation. In one embodiment, after creating the AMF entity types, the final phase of the transformation consists of creating the AMF entities (block 330 of FIG. 3A) for each previously defined AMF entity type based on the information captured by the Configuration Requirements.

Figure 12:
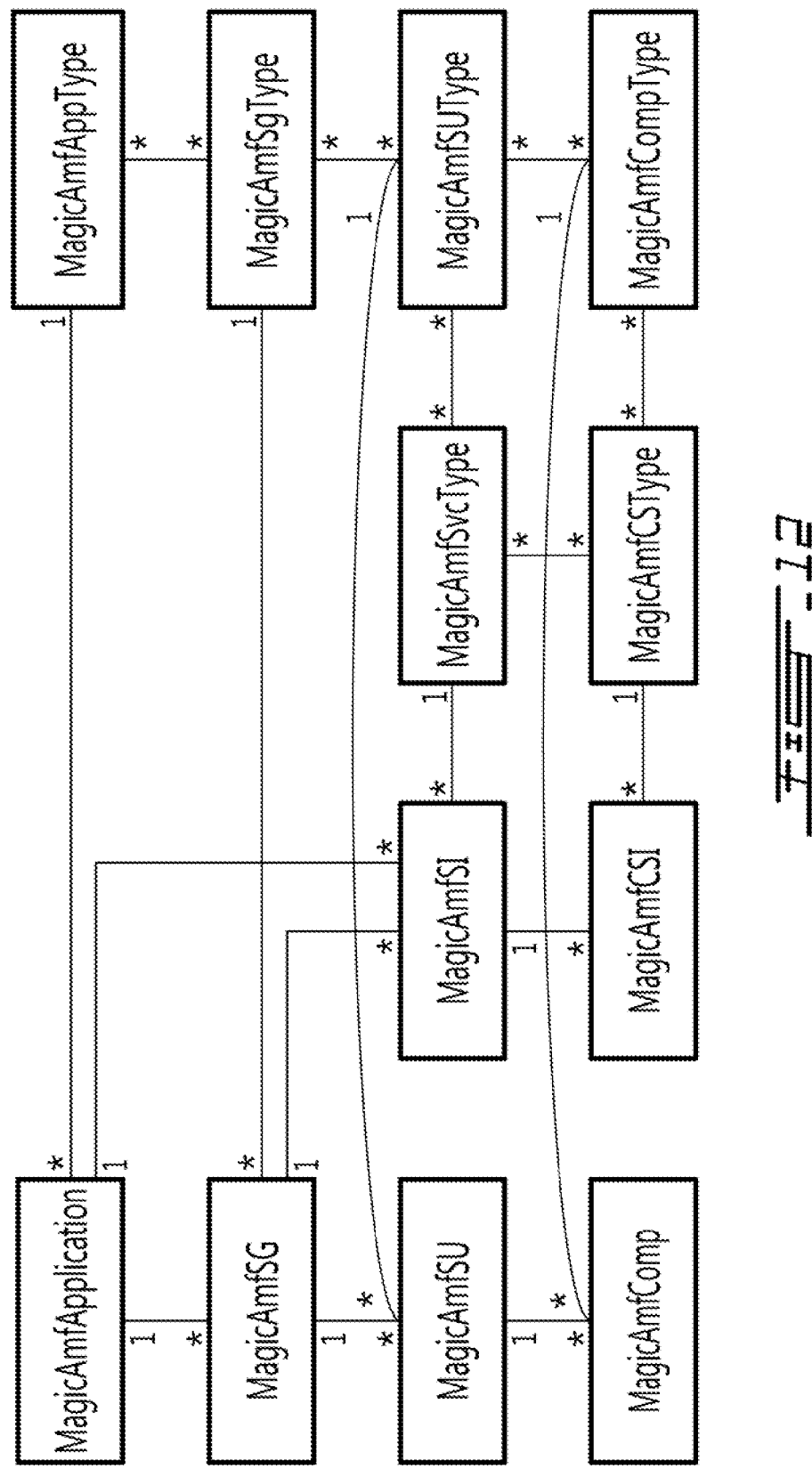
FIG. 12 illustrates a result of the AMF entity creation from a meta-model perspective according to one embodiment of the invention.

FIG. 12 is a diagram illustrating the result of the AMF entity creation from the meta-model perspective according to embodiments of the invention. Referring again to FIG. 3A, the AMF entity creation phase 330 takes as input the refined Configuration Requirements and the AMF model consisting of the generated AMF entity types. As a consequence of the previous transformation step, these models are connected by means of links defined among the AMF entity types (on one side) and the CSITemplates, SITemplates and SGTemplates (on the other side).

Similar to the generation of the entity types, the creation of entities starts from the Configuration Requirements elements. The generation of all the entities is driven by the characteristics of the entities types that have been created during the previous phase. The links defined between the Configuration Requirements elements and the AMF entity types ease the navigation of the AMF model favoring the direct access to most of the interesting properties of such types.

In one embodiment, the creation of the AMF entities includes three steps. The first step creates AMF entities, based on the AMF entity types created in the previous transformation phase 320 (FIG. 3A), as well as establishing the relationships among the AMF entities and AMF entity types. The second step aims at creating deployment entities. The third step prunes out all the Configuration Requirements elements as well as their links to the AMF configuration elements (i.e., the AMF entities and the AMF entity types). The result of this phase is a set of AMF entities and AMF entity types which form an AMF configuration that satisfy the configuration requirements. The following describes each transformation step in detail.

2.3.1 Step 1: Typed AMF entity instantiation. One main issue of this step consists of determining the number of entities that need to be generated for each identified entity type, and in defining the required links among the entities and the entity types. For some entities, this number can be fetched directly from the CR model, for others this number needs to be calculated. In both cases, the number of entities that needs to be created depends on the values of the attributes specified in Configuration Requirements and AMF entity type elements.

Figure 13:
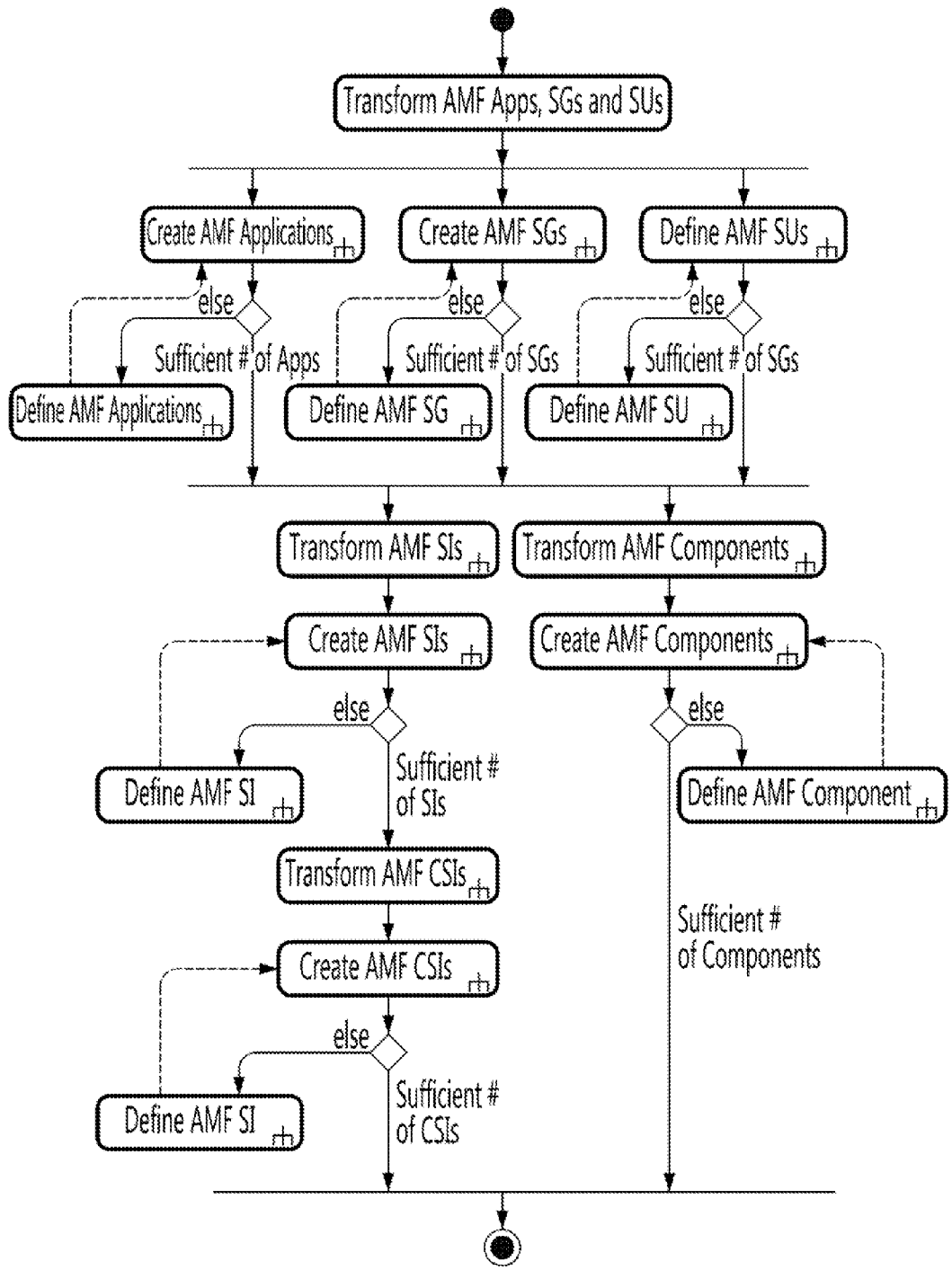
FIG. 13 illustrates an activity diagram describing a flow of transformations for generating AMF entities according to one embodiment of the invention.

FIG. 13 is an activity diagram illustrating the flows of transformations performed in the context of this instantiation step. The step of AMF entity instantiation starts with analyzing the SGTemplate and the AppType and SGType linked to the template and it creates instances of entities of these AMF types. From the SUType of the SGType it also generates the SUs providing the SIs that are protected by the generated SGs. Subsequently the SITemplates and CSITemplates are analyzed and their corresponding entities are generated from the associated SvcTypes, CSTypes and Component Types. Once the different entities have been generated, the generation defines the links between them, between the entities and the related types, and the associated templates. The fork sign in FIG. 13 indicates "multiplicity," that is, it indicates that multiple instances are generated.

This step can be performed by an AMF_APP_SG_SU_Transform rules and its helper functions. In one embodiment, the AMF_APP_SG_SU_Transform rule calculates the number of SGs, calculates the number of SUs, calculates the total number of SIs, creates the required number of entities and establishes the link between them to reflect the grouping properties as well as the protection relations. In turn the AMF_APP_SG_SU_Transform rule uses lazy rules and a similar approach to create and link the Components and CSIs to the created SUs and SIs.

In one embodiment, the AMF_APP_SG_SU_Transform rule refines the SGTemplate by adding the links to the AMF entities; namely, Application, SG, SU, and SIs. These AMF entities are instantiated using different helper functions which take the required number of instances as an input and return the collection of AMF entities. For the Application, there is only one instance needed for each SGTemplate; for SGs and SUs, the number is calculated from the information specified in the SGTemplate. For instance, the definition of AMF Application uses a createAMFApplication helper function and a lazy rule called APP_Define. The helper function creates a set of AMF application entities in a recursive manner, and, in each recursion it calls the APP_Define lazy rule. APP_Define instantiates an AMF application entity, initializes its attributes starting from a given AMF AppType, and finally connects the generated entity to the type. Afterwards, the instantiated AMF Application is added to the set of entities and returns to the caller rule. The number of recursions corresponds to the number of required AMF applications specified by AMF_APP_SG_SU_Transform as an input. The same approach is applied to create SGs, SUs and SIs by defining a helper function and a lazy rule.

The number of entities to be defined depends on the information which is specified in the CR model elements. Once the proper entities are generated they are linked to the appropriate configuration entities. For instance, the generated SUs are grouped into different SGs depending on their capability of providing the SIs of a given type.

The AMF_APP_SG_SU_Transform rule creates the link between newly generated AMF entities and connects them to the SGTemplate. Moreover, it creates the relation between the generated SGs and the protected set of SIs by means of a lazy rule AMF_SI_Transform. The rule is responsible for generating the required set of AMF SIs based on a given SITemplate. Also, AMF_APP_SG_SU_Transform uses a lazy rule AMF_Comp_Transform to generate the required components of each newly created SU and to connect them to the SU. These lazy rules can be applied in parallel.

The generation of the SIs is described by the lazy rule AMF_SI_Transform. This rule refines the SITemplate by adding the links to the set of SIs that is generated by the createAMFSI helper function. This function takes as input the required number of SIs and generates these entities using the same approach already described for the case of AMF Application entities. AMF_SI_Transform invokes createAMFSI by passing the number of SIs which is specified by the SITemplate. It also establishes the links between the created SIs and the previously created SGs which will protect these SIs. The AMF_SI_Transform also establishes the links between the newly generated SIs and CSIs they group by calling an AMF_CSI_Transform lazy rule. In addition, based on the dependency relationships specified in the SITemplate, this lazy rule establishes the dependency relationships between the newly created SIs and the SIs of the SITemplate on which the current SITemplate depends.

The lazy rule AMF_CSI_Transform refines the CSITemplate by specifying the links between the template and the required set of CSIs. CSIs are generated invoking the createAMFCSI helper function which takes as input the required number of CSIs. The helper function createAMFCSI uses the same approach applied for the generation of AMF Application entities. AMF_CSI_Transform calls createAMFCSI by passing the number of CSIs expressed in the CSITemplate. Moreover, based on the dependency relationships specified in the CSITemplate, this lazy rule establishes the dependency relationships between the newly created CSIs and the CSIs of the CSITemplate on which the current CSITemplate depends.

The AMF_Comp_Transform rule refines the CSITemplate by adding the links from these templates to the AMF Components. The number of components that are required to support the required number of CSIs is calculated based on the active load of the SU that will aggregate these components. This active load is calculated based on the required redundancy model expressed by the SGTemplate which contains the SITemplate that aggregate the current CSITemplate. The required set of AMF Components is generated by means of the helper function (createAMFComp) which takes the required number of components (NumOfComp) as an input. This helper function is similar to createAMFApplication.

2.3.2 Step 2: Instantiation of deployment entities. After creating service provider and service entities based on the previously generated entity types, in this step the deployment entities are generated. Moreover, the service provider entities (e.g. SU) are deployed on deployment entities (e.g. Node). For the sake of simplicity, it is assumed that all the nodes are identical and thus the SUs are distributed among nodes evenly. The number of nodes and their attributes are explicitly specified in the Configuration Requirements by means of the NodeTemplate element. The creation of the deployment entities can be supported by two different transformations that target the generation of AMF Nodes and AMF Cluster respectively. The generation can use a helper function to create the required number of AMF entities 2.3.3 Step 3: Finalizing the Generated AMF Configuration. As previously illustrated in FIG. 3A, the result of this phase is a model which is an instance of the AMF Sub-Profile. Therefore, once all the required AMF entity types and entities have been generated, the final step consists of removing all Configuration Requirements elements which were used to generate the AMF configuration. This step simply consists of copying (without any change) all the AMF configuration elements (entity types and entities and their association objects) and the relationships among them while leaving out the Configuration Requirements elements. To this end, for each AMF configuration entity and entity type it is required to define a transformation rule. These rules simply move the attributes of each model element as well as the relationships among them to the target model, which is the target AMF configuration.

3. Creating an AMF Sub-Profile Based on a UML Modeling Framework

The following section describes the creation of an AMF sub-profile based on a UML modeling framework. Although only the AMF sub-profile is described, the technique described below can also be applied to the creation of the ETF sub-profile and the CR sub-profile, except that the domain elements of these two sub-profiles are defined differently from those of the AMF sub-profile. Specifically, for the ETF sub-profile, the standard ETF XML schema defines the domain elements; for the CR sub-profile, there is no standard for defining its domain elements. In one embodiment, the domain elements of the CR-sub-profile can be based on a model that was defined for one of the known configuration generation methods. In some embodiments, the AMF sub-profile is created from a collection of AMF domain elements that are specified by the AMF specification (see, e.g., Service Availability Forum, Application Interface Specification. Availability Management Framework SAI-AIS-AMF-B.04.01). According to embodiments of the invention, the generation of AMF configurations is based on a precise UML modeling framework. The UML modeling framework can also enable the validation and analysis of AMF configurations. Embodiments of the invention extend the existing UML capabilities and semantics to model AMF elements and their relationships.

Using embodiments of the modeling framework, an AMF configuration designer can:

Create complex configurations that are semantically valid by construction with respect to the AMF specifications. In other terms, the tool will automatically enforce the constraints imposed on AMF entities and their relationships, and will reject any configuration that violates these constraints, relieving configuration designers from performing non-added value consistency checks.

Validate automatically the compliance of a configuration, provided by an external source, with the AMF specifications. Due to the complexity and size of typical configurations, it is difficult to validate their correctness manually or even semi-automatically.

The modeling framework also enables the design of advanced configuration generation plug-ins using a model driven approach. The model driven development has the advantage of remaining at the abstraction level from end-to-end, and avoiding the conversion to lower level representation and code. Using UML as the basis for the modeling framework facilitates greatly the development of model driven configuration generation techniques using the QVT (Query/View/Transformation) standard, which is another Object Management Group (OMG) standard compatible with UML.

In one embodiment, a UML profile (e.g., the AMF sub-profile in Sections 1 and 2) is created to define a UML-based domain specific language (its symbols and grammar) for the AMF domain elements that can be used to describe an AMF configuration. A UML profile consists of packages that contain three main elements: 1) Stereotypes, which are used to extend UML vocabulary by modifying the semantics of existing UML elements to adapt them to the elements of the new domain. 2) Tagged values, which are used to add new properties to stereotypes that describe the attributes of the domain elements. 3) Constraints, which are used to constrain the behavior of the stereotyped UML elements to confine to the rule of the new domain.

Creating a UML profile encompassed two main steps. The first step includes specifying the domain model of the profile, which describes in a formal way the elements of the domain (e.g., an AMF domain), the relationships among them, as well as the constraints they need to satisfy.

The second step includes mapping the AMF domain model to the UML meta-model. The result of the mapping is a set of stereotypes, tagged values and constraints. This step consists of identifying the most appropriate UML elements, represented as UML meta-classes, which need to be extended to support the AMF domain elements. There can be several UML meta-classes that are candidate base classes for a single AMF domain element. The challenge is to identify the most appropriate meta-classes that form an extension that is 1) complete by containing all the elements needed by the domain, 2) does not contradict or violate the UML meta-model, 3) reuses meta-classes based on their semantics, 4) reuses as many UML relationships between the stereotyped elements as possible, and 5) constrains the UML stereotyped elements to behave according to the rules of the new domain.

Figure 14:
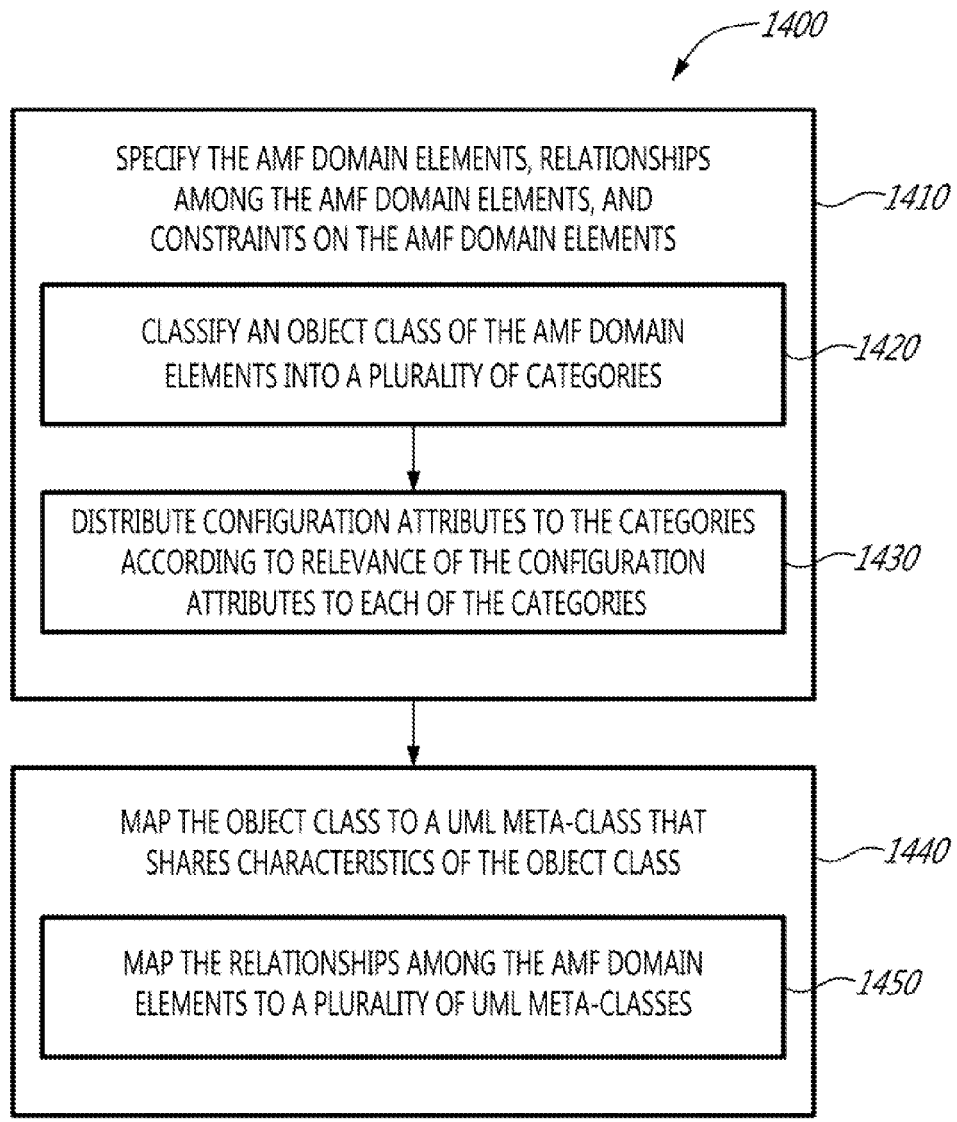
FIG. 14 is a flow diagram illustrating a method of creating an AMF sub-profile according to one embodiment of the invention.

FIG. 14 is a flow diagram illustrating a method 1400 for creating an AMF sub-profile from a collection of AMF domain elements that are specified by the AMF specification according to embodiments of the invention.

Referring to FIG. 14, in one embodiment, the method 1400 begins with specifying the AMF domain elements, relationships among the AMF domain elements, and constraints on the AMF domain elements (block 1410). To specify an object class of AMF domain elements, the object class can be classified into a plurality of categories according to pre-defined criteria (block 1420). Configuration attributes are distributed to the categories according to relevance of the configuration attributes to each of the categories (block 1430). The object class is then mapped to a UML meta-class that shares characteristics of the object class (block 1440). The relationships among the AMF domain elements can also be mapped to UML meta-classes (block 1450). The operations of blocks 1410-1450 are described in further details below.

Figure 15:
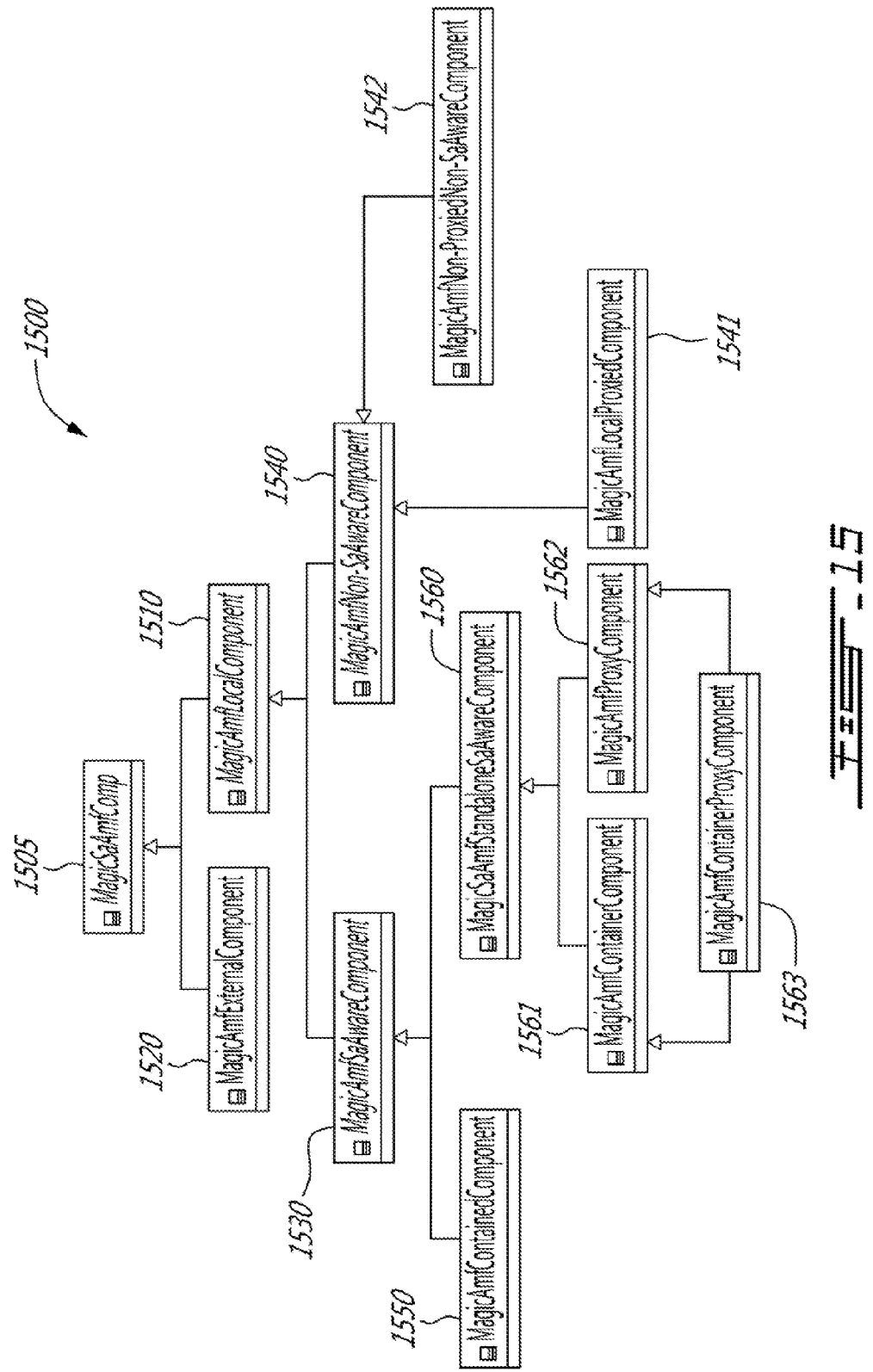
FIG. 15 illustrates a classification of AMF components according to one embodiment of the invention.

There exist several types of components in AMF. Components form an object class, which is represented in the standard AMF information model as one aggregate UML class, in which several configuration attributes may or may not apply to a particular component category of the specification. Embodiments of the invention provide representations to specialize the standard AMF component object class using four key criteria in the following order: locality, service availability awareness (SA-awareness for short), containment, and mediation function. An embodiment of a resulting component classification 1500 based on these criteria is shown in FIG. 15. The locality criterion distinguishes components 1505 that reside within an AMF cluster (i.e., local components 1510) from the ones that are located outside the cluster (i.e. external components 1520). The external components 1520 are always proxied to be controlled by AMF. The next criterion, SA-awareness, can be used to classify the local components 1510 into two categories: SA-aware components

1530 and non-SA-aware components 1540. The SA-aware components 1530 represent the components that implement the AMF API and directly interact with an AMF implementation to manage service availability. The non-SA-aware components 1540 are those local components 1510 which are not the SA-aware components 1530. The SA-aware components 1530 are further specialized using the other two criteria. The containment criterion can be used to classify the SA-aware components 1530 into contained components 1550 and standalone components 1560. Each contained component 1550 represents a software entity that does not run directly on an operating system but uses an intermediate environment like a virtual machine (for example, to support Java-like programs). The standalone components 1560 are those SA-aware components 1530 which are not contained components 1560. Based on their mediation function, the standalone components 1560 can be classified into proxy components 1562, which are used to give AMF some control over hardware, external or legacy software (e.g. software entities built for another high availability middleware), and container components 1561, which provide AMF access to the execution environment of contained components 1550 as needed for life-cycle control. Under the container components 1561 and the proxy component 1562 are container-proxy components 1563. The non-SA-aware (local) components 1540 are classified only based on the mediation criteria; that is, whether they are mediated via a proxy. Accordingly, the non-SA-aware components 1540 are classified into proxied components 1541 and non-proxied components 1542.

This classification of the AMF components enabled distribution of the configuration attributes according to their relevance to each of these categories. This eliminates many optional attributes and, consequently, reduces the risks of misconfigurations. In addition, this categorization provides a contextualization of the constraints and thus presents a more effective way for capturing constraints on AMF configurations according to their relevance to the different categories and their specific attributes.

It is worth noting that applying the different criteria in a different order would result in a different classification, but one that would not be outside the intended scope of the invention.

In addition to the above specialization of the component class, a new attribute has been added that represents pre-instantiability at the type level of components (i.e., a component type). All components of a component type (i.e., instantiated from the same software) share the value of this attribute.

Figure 16:
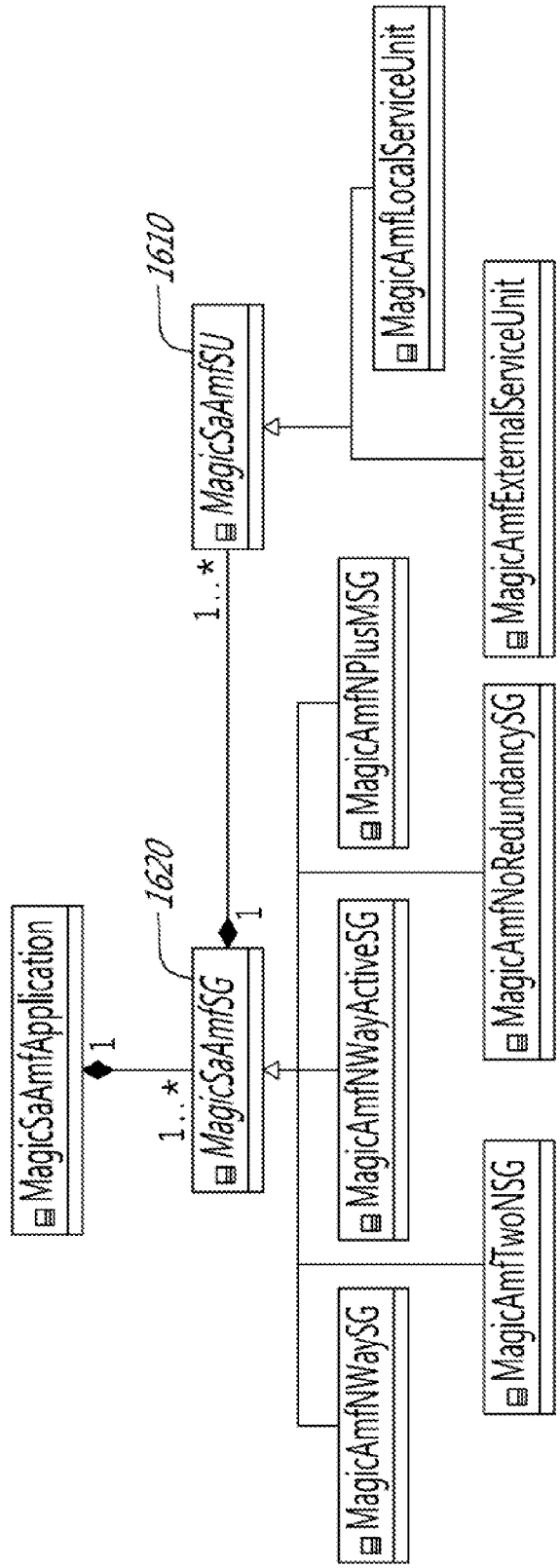
FIG. 16 illustrates a classification of service units (SUs) and service groups (SGs) according to one embodiment of the invention.

FIG. 16 is a diagram illustrating a classification of service units (SUs) and service groups (SGs) according to embodiments of the invention. To provide a higher level service, components are grouped into SUs 1610. As opposed to the standard AMF information model, embodiments of the invention distinguish between local SUs and external SUs based on whether or not they contain local or external components. The corresponding SU types are also classified into local SUTypes and external SUTypes. SUs are organized into SGs 1620 to protect services using different redundancy models (e.g., 2N, N+M, etc.). In the UML class definitions, embodiments of the invention distinguish the SGs based on the standard redundancy models, which are: 2N, N+M, N-Way, N-Way-Active and No-redundancy. Each of these SGs is represented by a distinct class as shown in FIG. 16. The standard SG configuration attributes depicted in the AMF specification have been re-organized according to their relevance to the newly introduced SG classes.

The SG type and application type remain the same as in the AMF specification as there is no specific reason to specialize them. The component service instance (CSI), service instance (SI) entities, and their respective types also remain the same as in the standard AMF information model.

Deployment entities include cluster, node and node group. An AMF cluster is a complete set of AMF nodes in the AMF configuration. A node represents a complete inventory of the SUs and, consequently, the corresponding components it hosts. A node group represents a set of nodes and is used to instruct AMF on how to deploy the local SUs in one of the nodes in the group. These classes are also taken unchanged from the standard AMF information model according to the AMF specification.

As indicated above, one of the merits of the classification of components is to enable the contextualization of the constraints. An example that illustrates this point is the following: according to the AMF specification "the only valid redundancy model for the SGs whose SUs contain a container component is the N-Way-Active redundancy model." This is expressed in OCL in the context of the container component category represented by the class MagicAmfContainerComponent, and using the specific class for the SG associated with the N-Way-Active redundancy model, MagicAmfN-WayActiveSG. Therefore, this restriction can be captured in OCL as follows:

```
context MagicAmfContainerComponent
inv: self.magicAmfLocalComponentMemberOf.
magicAmfLocalServiceUnitMemberOf.
oclIsKindOf(MagicAmfN-WayActiveSG)
```

Once the first step is completed (i.e., when AMF domain elements are specified), the second step in designing a UML profile is the mapping of the domain elements to the UML meta-model. For this purpose, one needs to proceed step-by-step through the full set of domain elements (specified as classes in the domain model), identifying the most appropriate UML base elements for each of them. In this step, the objective is to find the UML meta-class which is conceptually and semantically similar to each domain element. The output of the mapping phase is a set of introduced stereotypes and a UML meta-class (i.e., a UML profile) from which each stereotype is derived. In addition to the stereotypes, tagged values and constraints are also defined. In some versions of UML (e.g., UML 2.0), inheritance relationship between stereotypes is supported. Thus, not all domain elements need to be directly derived from the corresponding UML meta-classes. Instead, some of them can directly inherit from the newly created stereotypes.

The stereotypes defined in the above profile for AMF domain entities and entity types are presented below. For each stereotype, a corresponding UML meta-class is presented for the mapping. In addition, the rationale behind the selection of each UML meta-class is also presented below.

The component in AMF represents the encapsulation of the functionality of the software (or hardware) that provides services and which is the smallest replaceable unit that represents a fault zone. This is similar to the element of the Component in UML, which is defined as "a modular part of a system that encapsulates its contents and whose manifestation is replaceable within its environment." Thus, the AMF component (MagicSaAmfComp 1505 of FIG. 15) can be mapped to the UML Component meta-class. Additionally, a new stereotype called <<MagicSaAmftomponent>> is created to characterize an AMF component using UML. As a result, the stereotypes for the different categories of components are indirectly mapped through the inheritance relationships between stereotypes to the Component meta-class.

An SU in the AMF domain is a logical entity that aggregates a set of components by combining their individual functionalities to provide a higher level service. From this perspective, one could see an SU as a service provider, similar to a component, but at higher level of abstraction. Therefore, an SU can be mapped to the UML Component meta-class as well. The stereotype <<MagicSaAmfSU>> is used to represent an SU. Using the inheritance relation, local and external SUs are represented using the <<MagicAmfLocalServiceUnit>> and <<MagicAmfExternalServiceUnit>> stereotypes, both of which inherit from <<MagicSaAmfSU>>.

One of the key characteristics of a service group (SG) is collecting service units. Given that in UML "a package is used to group elements, and provides a namespace for the grouped elements" (see, e.g., Object Management Group: Unified Modeling Language—Superstructure Version 2.1.1 formal/2007-02-03), it might appear that the meta-class Package would be a suitable base class for the service group. However, in addition to its ability to group SUs, an SG also ensures availability of services by means of redundancy models for a certain set of service instances (assigned to the service units that the service group contains). Since an SG does more than just packaging the elements it contains, it is more appropriate to map an SG to the Component UML meta-class, which not only has the ability to contain other components (in this case an SG contains SUs) but also can offer a service. The service offered by an SG can be seen as the ability to protect SIs assigned to its SUs. Therefore, a stereotype <<MagicSaAmfSG>> is created to represent an SG. A stereotype has also been created for each SG category (e.g. MagicSaAmf2NSG). These stereotypes derive from <<MagicSaAmfSG>> through inheritance.

An application is a logical entity that contains one or more service groups. An application combines the individual functionalities of the constituent service groups in order to provide a higher level service. Similar to an SU, the UML Component meta-class is found to be a suitable base class for the stereotype designed to represent an AMF application (<<MagicSaAmfApplication>>).

In the UML specification, the Classifier is an abstract meta-class which is a namespace whose members can include features. The BehavioralClassifier meta-class represents a specific type of Classifier, which may have an interface realization. Since component service instances (CSIs) can be considered to be realizations of the services that AMF dynamically assigns to components as workload, the BehaviouralClassifier seems to be a good candidate for the CSI. However, a closer look at the role of the CSIs in AMF reveals that it describes the characteristics of the workload which will be assigned to the component at run-time and not the service itself. Therefore, the option of meta-class BehavioralClassifier has been discarded.

On the other hand, in UML, "a class describes a set of objects that share the same specifications of features, constraints, and semantics," and thus, the meta-class Class is semantically closer to the CSI. Therefore, in one embodiment, the meta-class Class is used as a base class for the stereotype that has been defined for CSI (<<MagicSaAmfCSI>>).

A service instance (SI) is an aggregation of all CSIs to be assigned to the individual components of the service unit in order to provide that particular service. Semantically, an CS shares most of the characteristics of the component service instance just at a higher level of abstraction. Consequently, in one embodiment, similarly to the CSI mapping, the meta-class Class is used as the base class for the stereotype defined for the SI (<<MagicSaAmfSI>>).

A node in the AMF domain is a logical entity that represents the complete inventory of the service units it hosts. In one embodiment, an AMF node is mapped to the UML meta-class Node since in UML "a node is computational resource upon which artifacts may be deployed for execution," which is similar to the AMF node. The stereotype <<MagicSaAmfNode>> is created to represent an AMF node.

The complete set of AMF nodes of the AMF configuration defines the AMF cluster. In addition a list of nodes, which is referred in AMF as a node group, may be used for SGs and SUs to configure their location. So the role of an AMF cluster and node group is the grouping of different AMF nodes. Looking at the UML specification, "a package is used to group elements, and provides a namespace for the grouped elements." Therefore, in one embodiment, the meta-class Package is used as the base class for the AMF cluster and node groups. The stereotypes <<MagicSaAmfCluster>> and <<MagicSaAmfNodeGroup>> are used to refer to these two entities.

In general, the type of an AMF entity describes the restrictions that should be respected by this entity. All entities of the same type share the attribute values defined in the entity type. Some of the attribute values may be overridden, and some other ones may be extended by the entity at configuration time. In other words, the type is the generalization of similar entities. For example, the SG type is a generalization of similar SGs that follow the same redundancy model, provide similar availability, and are composed of units of the same SU types. In UML, the meta-class Class describes a set of objects that share the same specifications of features, constraints, and semantics. Therefore, in one embodiment, the UML meta-class Class is used as the base class for all AMF entity types.

A summary of stereotypes for the different AMF entities and entity types at their top level along to the UML meta-classes is presented below in Table 1 according to one embodiment of the invention. It is understood that, in other embodiments, the same elements can be mapped differently depending on a different set of mapping criteria.

TABLE 1

Stereotypes Related to Domain Elements in AMF

| Stereotype | UML Meta-Class |
|---|---|
| <<MagicSaAmfAppType>> | Class |
| <<MagicSaAmfSGType>> | Class |
| <<MagicSaAmfSUType>> | Class |
| <<MagicSaAmfCompType>> | Class |
| <<MagicSaAmfSvcType>> | Class |
| <<MagicSaAmfCSType>> | Class |
| <<MagicSaAmfApplication>> | Component |
| <<MagicSaAmfSG>> | Component |
| <<MagicSaAmfSU>> | Component |
| <<MagicSaAmfComp>> | Component |
| <<MagicSaAmfSI>> | Class |
| <<MagicSaAmfCSI>> | Class |
| <<MagicSaAmfCluster>> | Package |
| <<MagicSaAmfNodeGroup>> | Package |
| <<MagicSaAmfNode>> | Node |

In the following, the mapping of the relationships among the previously-defined stereotypes for AMF is presented. This mapping of the relationships allows reuse of the associations between the stereotyped meta-classes as much as possible and avoids creation of additional associations and constraining existing ones.

In the AMF domain, six relationship categories can be distinguished between domain elements:

Provide: This relationship is used between service providers and service elements (e.g. the relationship between an SU and an SI).

Type: represents the relationship between AMF entities and their type (e.g. the relationship between component and component type).

Group: represents the relationship between a compound element and its composing elements (e.g. the relationship between an SU and its components).

Protect: represents the relationship between SIs and an SG, which protects those SIs.

Deploy: represents the relationship between an element and the hosting element (e.g. between an SU and a node, or between an SG and a node group).

Member node: represents the relationship between a node and the cluster or a node group The selection of meta-classes as base classes for the stereotypes of the domain elements allows for reuse of many of the associations in the UML meta-model for these relationships. For each relationship between the domain elements, an appropriate association can be reused between the corresponding meta-classes. Each relationship can be stereotyped accordingly to form a relationship stereotype. Each relationship stereotype can be mapped to an Association, an AssociationClass, or a Dependency as its base meta-class.

Figure 17:
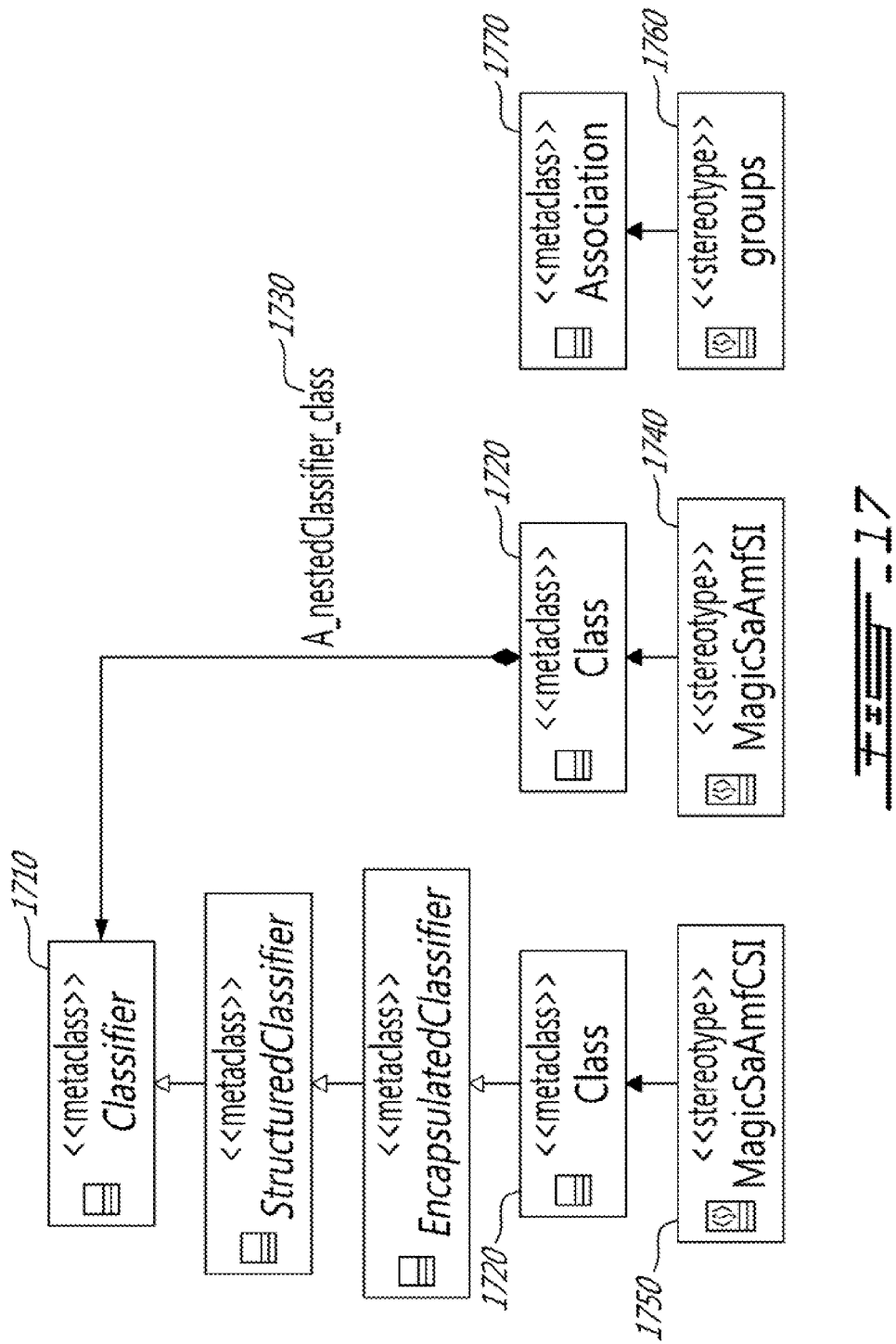
FIG. 17 illustrates a relationship between service instances (SIs) and component service instances (CSIs) stereotypes according to one embodiment of the invention.

FIG. 17 is a diagram illustrating the relationship between service instances (SIs) and component service instances (CSIs) according to embodiments of the invention. For example, as described previously, <<MagicSaAmfSI>> and <<MagicSaAmfCSI>> stereotypes are created and are able to represent an SI and a CSI, respectively. Both stereotypes are mapped to the UML meta-class Class 1720. Since the meta-class Class 1720 inherits indirectly from the meta-class Classifier 1710 in the UML meta-model, there is an association between the classes Class and Classifier called "nestedClassifier" 1730, which allows classifiers to group other classifiers. In one embodiment, the association 1730 is reused to express that an SI (now represented as <<MagicSaAmfSI>> 1740) groups CSIs (now represented as <<MagicSaAmfCSI>> 1750). Therefore, as shown in FIG. 17, a stereotype called <<groups>> 1760 is defined that captures this relationship and maps it to meta-class Association 1770.

A summary of all stereotypes that have been defined for the relationships between AMF domain elements along with their base-classes is presented in Table 2 according to one embodiment of the invention. It is understood that, in other embodiments, a different set of relationship categories may be used and may be mapped differently depending on a different set of criteria without departing from the scope of the present invention.

TABLE 2

Summary of Stereotyped UML Relationships Adapted to AMF

| Stereotype | UML Meta-Class | Reused relationship from UML meta-model |
|---|---|---|
| <<provide>> | Association | Relationship between Class and Classifier |
| <<type>> | Association | Relationship between Component and Classifier |
| <<groups>> | Association | Relationship between Class and Classifier |
| <<protect>> | Association | Relationship between Component and Classifier |

TABLE 2-continued

Summary of Stereotyped UML Relationships Adapted to AMF

| Stereotype | UML Meta-Class | Reused relationship from UML meta-model |
|---|---|---|
| <<deploy>> | Dependency | Relationship between Component and Classifier inherited by Node |
| <<membernode>> | Dependency | Relationship between Namespace and Package inherited by Node |

Once the stereotypes have been defined, the tagged values that represent the properties of these stereotypes can also be defined. In one embodiment, the tagged values are defined at least for those properties that are not included in UML.

For example, an AMF component (at the domain element level) can contain the following attributes:

```
magicSafComp
magicSaAmfCompDisableRestart
magicSaAmfCompRecoveryOnError
magicSaAmfCompInstantiateTimeout
magicSaAmfCompCleanupTimeout
magicSaAmfCompNumMaxInstantiateWithoutDelay
magicSaAmfCompNumMaxInstantiateWithDelay
magicSaAmfCompDelayBetweenInstantiateAttempts
magicSaAmfCompTerminateTimeout
```

For each of these attributes, a tagged value can be created and added to the AMF component stereotype <<MagicSaAmfComp>>, which can be derived from the UML meta-class Component.

After specifying the stereotypes and tagged values of the profile, the next step is to ensure that the stereotyped UML base meta-classes do not have attributes, associations, or constraints that conflict with the semantics of the domain model. If this is the case, the UML itself is restricted to match the semantics of the AMF domain to guarantee the consistency of the profile with the domain elements. Thus, a set of constraints may need to be defined for the domain elements and for the relationships.

As shown in FIG. 17, a stereotype based on the UML Association has been defined to represent the grouping association, called <<groups>> 1760, between AMF entities (e.g. between an SG and an SU or an SI and a CSI). Because UML allows the use of association between all sorts of UML elements, including the meta-classes Class, Component, and Node, which without further restrictions would allow the use of the <<groups>> 1760 relationship among others to group CSIs into an AMF application. This is semantically invalid with respect to the AMF domain specification. Therefore, in one embodiment, the <<groups>> 1760 relationship is constrained.

Different constraints in OCL to restrict the UML meta-model according to the context of AMF can be defined. For example, the <<groups>> relationship can be restricted in the following way to be used between a component and an SU:

```
context groups
inv :
   (self.endType( )->at(1).oclIsKindOf(MagicSaAmfComp)or
      self.endType( )-> at(1).oclIsKindOf(MagicSaAmfSU))
   and
   (self.endType( )-> at(2).oclIsKindOf(MagicSaAmfComp)or
      self.endType( )->at(2).oclIsKindOf(MagicSaAmfSU))
   and
   (self.endType( )->at(1).oclIsKindOf(MagicSaAmfComp)implies
      self.endType( )-> at(2).oclIsKindOf(MagicSaAmfSU))
   and
   (self.endType( )->at(2).oclIsKindOf(MagicSaAmfComp)implies
      self.endType( )-> at(1).oclIsKindOf(MagicSaAmfSU))
```

Similar constraints can be defined for all other cases when the <<groups>> 1760 relationship is used, and also for all other relationships that are stereotyped for AMF.

There are two sets of constraints that need to be considered: The stereotypes that correspond to the AMF domain elements have to be constrained the same way as their corresponding domain elements to restrict their behavior according to the AMF specification. The second group of constraints is between UML elements to restrict the UML meta-model. Two constraints can be identified and are described below.

The first constraint disables the UML generalization relationship (i.e. inheritance) when applied to the UML stereotyped meta-classes in the context of AMF. This is because AMF does not allow the generalization relationship among the domain model elements that correspond to these stereotypes. For example, an AMF component cannot inherit from another AMF component, although the stereotype for the AMF model element MagicSAAmfComponent derives from the UML meta-class Component that would normally accept inheritance. The below constraint can be added as part of the constraints that have been defined for the stereotypes.

self.general( )→isEmpty( )

The second constraint enforces that the models generated using the above-described modeling framework use only the stereotyped relationships that have been defined in the above. This can be achieved by the following constraint.

```
self.ownedAttribute->select(p:Property|p.opposite->notEmpty( ))->
forAll(c:Property|c.association.getAppliedStereotypes( )->notEmpty( ))
```

FIG. 18 illustrates a diagrammatic representation of a machine in the exemplary form of a computer system 1800 within which a set of instructions, for causing the machine to perform any one or more of the methodologies discussed herein, may be executed. The computer system 1800 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1800 includes a processing device 1802 coupled to a non-transitory computer readable storage medium, such as: a main memory 1804 (e.g., read-only memory (ROM), flash memory, dynamic random access memory (DRAM) such as synchronous DRAM (SDRAM) or Rambus DRAM (RDRAM), etc.), a static memory 1806 (e.g., flash memory, static random access memory (SRAM), etc.), and a secondary memory 1818 (e.g., a data storage device), which communicate with each other via a bus 1830. The computer readable storage medium may also include any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or any type of media suitable for storing electronic instructions.

The processing device 1802 represents one or more general-purpose processing devices, each of which can be: a microprocessor, a central processing unit (CPU), a multicore system, or the like. More particularly, the processing device 1802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1802 may also be one or more special-purpose processing devices such as an application specific integrated circuit (ASIC), a field programmable gate array (FPGA), a digital signal processor (DSP), network processor, or the like. In one embodiment, the processing device 1802 is adapted to execute the AMF logic 1822 for performing the operations and steps of generating an AMF configuration as described above (e.g., the methods illustrated in FIGS. 2B, 3B, 4B and 14).

The computer system 1800 may further include a network interface device 1808. A part or all of the AMF logic 1822 may be transmitted or received over a network 1820 via the network interface device 1808. The computer system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), and a signal generation device 1816 (e.g., a speaker).

In one embodiment, the AMF logic 1822 may be stored in the non-transitory computer readable storage medium of the secondary memory 1818 and/or the static memory 1806. The AMF logic 1822 may also reside, completely or at least partially, within the main memory 1804 and/or within the processing device 1802 during execution thereof by the computer system 1800. The AMF logic 1822 may be stored in the same computer system 1800 or distributed on multiple computer systems 1800.

The term "non-computer readable storage medium" should be taken to include a single medium or multiple media (e.g., a centralized or distributed database, and/or associated caches and servers) that store the one or more sets of instructions.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method of generating an Availability Management Framework (AMF) configuration for providing services and protecting the services against resource failure, wherein the AMF configuration is an instance of an AMF sub-profile that defines AMF elements to be used to model resources and the services, and is generated from an instance of an Entity Type Files (ETF) sub-profile, which is called an ETF model, and an instance of a Configuration Requirements (CR) sub-profile, which is call a CR model, each of the AMF sub-profile, the ETF sub-profile and the CR sub-profile being specializations of a pre-defined Unified Modeling Language (UML) meta-model, the method comprising the steps performed by a computer of:
   receiving the ETF model, which defines a set of ETF prototypes of the ETF model that describe the resources provided by vendors;
   receiving the CR model, which defines a set of CR elements of the CR model that specify configuration requirements;
   applying a set of transformation rules, which are pre-defined for the ETF sub-profile, the CR sub-profile and the AMF sub-profile, to transform the ETF model and the CR model into an AMF model as the AMF configuration, wherein the CR model is organized as a first hierarchy of the CR elements, the ETF model is organized as a second hierarchy of the ETF prototypes, and one or more levels of the first hierarchy are missing levels in the second hierarchy, the step of applying further comprising the steps of:
      transforming a selected subset of the ETF prototypes of the ETF model that satisfy the configuration requirements into a collection of the AMF elements organized as a hierarchy with the one or more levels missing; and building the one or more missing levels from the collection of the AMF elements based on relationships between the one or more missing levels and existing levels of the first and second hierarchies; and storing the AMF configuration to be used for availability management.

2. The method of claim 1, wherein the step of applying further comprises the step of:
   from the ETF model, selecting the ETF prototypes that satisfy the configuration requirements to form the selected subset of the ETF prototypes;
   creating a collection of AMF Types that describe characteristics of the AMF elements based on the selected subset of the ETF prototypes and the CR model; and
   creating a set of the AMF elements based on the collection of AMF Types and the CR model to form the AMF configuration.

3. The method of claim 1, wherein the step of applying further comprises the steps of:
   transforming the ETF model and the CR model into a selected ETF model and a first CR model, respectively, the selected ETF model including only the selected subset of the ETF prototypes that satisfy the configuration requirements, and the first CR model being the CR model with additional links to the selected subset of the ETF prototypes to indicate relationships with the selected subset of the ETF prototypes;
   transforming the selected ETF model and the first CR model into an AMF Types model and a second CR model, the AMF Types model including a collection of AMF Types that describe characteristics for corresponding AMF entities, the second CR model being the first CR model with the additional links replaced with links to the collection of AMF Types to indicate relationships with the collection of AMF Types; and
   transforming the AMF Types model and the second CR model into the corresponding AMF entities including components, component service instances (CSIs), service units (SUs), service instances (SIs), service groups (SGs), and applications, to complement the AMF model and form the AMF configuration.

4. The method of claim 1, wherein the method further comprises the steps of: selecting, along a first direction of moving up the second hierarchy, the set of the ETF prototypes that provide the services required by the CR model; removing, along a second direction of moving down the second hierarchy, the ETF prototypes that do not satisfy the configuration requirements; and removing, by examining all levels of the second hierarchy in parallel, the ETF prototypes that are not required by the configuration requirements to produce the selected subset of the ETF prototypes.

5. The method of claim 1, wherein the step of selecting further comprises the steps of:
determining whether the capability of an ETF prototype in the ETF model is compliant with a redundancy model specified by a parent of the ETF prototype in the second hierarchy; and
determining whether the redundancy model specified by the parent of the ETF prototype is compliant with a required redundancy model specified by the CR model.

6. The method of claim 1, wherein the step of transforming further comprises the steps of:
generating a first set of AMF Types that have counterpart ETF prototypes in the ETF model; and
generating a second set of AMF Types that do not have counterpart ETF prototypes in the ETF model, the second set of AMF Types characterized by a set of attributes which are initialized with information described in the CR model,
wherein the AMF Types include component types, service unit (SU) types, service group (SG) types, application types, service types, and component service (CS) types.

7. The method of claim 6, wherein the first set of AMF Types and the second set of AMF Types form a collection of AMF Types, the method further comprising the steps of: determining a number of AMF entities to be generated for each AMF Type in the collection of AMF Types based on attribute values specified in the CR model; and creating links among the AMF entities and the collection of the AMF Types.

8. The method of claim 1, wherein the AMF sub-profile is created from a collection of AMF domain elements that are specified by AMF specification, the AMF domain elements including components, service units (SUs), service groups (SGs), and applications, and wherein each of the components, the SUs, the SGs, and the applications is mapped to a UML component meta-class.

9. The method of claim 8, wherein the AMF domain elements include service instances (SIs), component service instances (CSIs), clusters, node groups, application types, SG types, SU types, component types, service types (Svc types), component service types (CS types), and wherein each of the SIs, the CSIs, the clusters, the node groups, the application types, the SG types, the SU types, the component types, the Svc types, and the CS types is mapped to a UML class meta-class.

10. The method of claim 8, wherein relationships among the AMF domain elements are mapped to a plurality of UML meta-classes, the relationships including provide, type, groups and protect are mapped to a UML association meta-class, and the relationships including deploy and member node are mapped to a UML dependency meta-class.

11. A computer system configured to generate an Availability Management Framework (AMF) configuration for providing services and protecting the services against resource failure, wherein the AMF configuration is an instance of an AMF sub-profile that defines a set of AMF elements to be used to model resources and the services, and is generated from an instance of an Entity Types File (ETF) sub-profile, which is called an ETF model, and an instance of a Configuration Requirements (CR) sub-profile, which is called a CR model, each of the AMF sub-profile, the ETF sub-profile and the CR sub-profile being with a specialization of a pre-defined Unified Modeling Language (UML) meta-model, the computer system comprising: a memory storing: the ETF model, which defines a set of ETF prototypes of the ETF model that describe the resources provided by vendors; and the CR model, which defines a set of CR elements of the CR model that specify configuration requirements; and a processor coupled to the memory, the processor configured to: receive the ETF model and the CR model, and apply a set of transformation rules, which are pre-defined for the ETF sub-profile, the CR sub-profile and the AMF sub-profile, to transform the ETF model and the CR model into an AMF model as the AMF configuration, wherein the CR model is organized as a first hierarchy of the CR elements, the ETF model is organized as a second hierarchy of the ETF prototypes, and one or more levels of the first hierarchy are missing in the second hierarchy, the processor is further configured to transform a selected subset of the ETF prototypes of the ETF model that satisfy the configuration requirements into a collection of the AMF elements organized as a hierarchy with the one or more levels missing, and build the one or more missing levels from the collection of the AMF elements based on relationships between the one or more missing levels and existing levels of the first and the second hierarchies.

12. The computer system of claim 11, wherein the computer system is further configured to: from the ETF model, select the ETF prototypes that satisfy the configuration requirements to form the selected subset of the ETF prototypes; create a collection of AMF Types that describe characteristics of the AMF elements based on the selected subset of the ETF prototypes and the CR model; and create the subset of the AMF elements based on the collection of AMF Types and the CR model to form the AMF configuration.

13. The computer system of claim 11, wherein the computer system is further configured to: transform the ETF model and the CR model into a selected ETF model and a first CR model, respectively, the selected ETF model including only the selected subset of the ETF prototypes that satisfy the configuration requirements, and the first CR model being the CR model with additional links to the selected subset of the ETF prototypes to indicate relationships with the selected subset of the ETF prototypes; transform the selected ETF model and the first CR model into an AMF Types model and a second CR model, the AMF Types model including a collection of AMF Types that specify characteristics for corresponding AMF entities, the second CR model being the first CR model with the additional links replaced with links to the collection of AMF Types to indicate relationships with the collection of AMF Types; and transform the AMF Types model and the second CR model into the corresponding AMF entities including components, component service instances (CSIs), service units (SUs), service instances (SIs), service groups (SGs), and applications, to complement the AMF model and form the AMF configuration.

14. The computer system of claim 11, wherein the computer system is further configured to: select, along a first direction of moving up the second hierarchy, the set of the ETF prototypes that provide the services required by the CR model; remove, along a second direction of moving down the second hierarchy, the ETF prototypes that do not satisfy the configuration requirements; and remove, by examining all levels of the second hierarchy in parallel, the ETF prototypes that are not required by the configuration requirements to produce the selected subset of the ETF prototypes.

15. A non-transitory computer readable storage medium having stored therein instructions that, when executed by a computer system, cause the computer system to perform a method of generating an Availability Management Framework (AMF) configuration for providing services and protecting the services against resource failure, wherein the AMF configuration is an instance of an AMF sub-profile that defines AMF elements to be used to model resources and the services, and is generated from an instance of an Entity Type Files (ETF) sub-profile, which is called an ETF model, and an instance of a Configuration Requirements (CR) sub-profile, which is call a CR model, each of the AMF sub-profile, the ETF sub-profile and the CR sub-profile being specializations of a pre-defined Unified Modeling Language (UML) meta-model, the method comprising the steps of: receiving the ETF model, which defines a set of ETF prototypes of the ETF model that describe the resources provided by vendors; receiving the CR model, which defines a set of CR elements of the CR model that specify configuration requirements; and applying a set of transformation rules, which are pre-defined for the ETF sub-profile, the CR sub-profile and the AMF sub-profile, to transform the ETF model and the CR model into an AMF model as the AMF configuration, wherein the CR model is organized as a first hierarchy of the CR elements, the ETF model is organized as a second hierarchy of the ETF prototypes, and one or more levels of the first hierarchy are missing levels in the second hierarchy, the step of applying further comprising the steps of: transforming a selected subset of the ETF prototypes of the ETF model that satisfy the configuration requirements into a collection of the AMF elements organized as a hierarchy with the one or more levels missing; and building the one or more missing levels from the collection of the AMF elements based on relationships between the one or more missing levels and existing levels of the first and second hierarchies.

16. The non-transitory computer readable storage medium of claim 15, wherein the step of transforming further comprises the step of:
from the ETF model, selecting the ETF prototypes that satisfy the configuration requirements to form the selected subset of the ETF prototypes;
creating a collection of AMF Types that describe characteristics of the AMF elements based on the selected subset of the ETF prototypes and the CR model; and
creating the subset of the AMF elements based on the collection of AMF Types and the CR model to form the AMF configuration.

17. The non-transitory computer readable storage medium of claim 15, wherein the step of applying further comprises the steps of:
transforming the ETF model and the CR model into a selected ETF model and a first CR model, respectively, the selected ETF model including the selected subset of the ETF prototypes that satisfy the configuration requirements, and the first CR model being the CR model with additional links to the selected subset of the ETF prototypes to indicate relationships with the selected subset of the ETF prototypes;
transforming the selected ETF model and the first CR model into an AMF Types model and a second CR model, the AMF Types model including a collection of AMF Types that specify characteristics for corresponding AMF entities, the second CR model being the first CR model with the additional links replaced with links to the collection of AMF Types to indicate relationships with the collection of AMF Types; and
transforming the AMF Types model and the second CR model into the corresponding AMF entities including components, component service instances (CSIs), service units (SUs), service instances (SIs), service groups (SGs), and applications, to complement the AMF model and form the AMF configuration.

18. The non-transitory computer readable storage medium of claim 15, wherein the method further comprises the steps of: selecting, along a first direction of moving up the second hierarchy, the set of the ETF prototypes that provide the services required by the CR model; removing, along a second direction of moving down the second hierarchy, the ETF prototypes that do not satisfy the configuration requirements; and removing, by examining all levels of the second hierarchy in parallel, the ETF prototypes that are not required by the configuration requirements to produce the selected subset of the ETF prototypes.

19. The non-transitory computer readable storage medium of claim 15, wherein the AMF sub-profile is created from a collection of AMF domain elements that are specified by AMF specification, the AMF domain elements including components, service units (SUs), service groups (SGs), and applications, and wherein each of the components, the SUs, the SGs, and the applications is mapped to a UML component meta-class.

20. The non-transitory computer readable storage medium of claim 19, wherein relationships among the AMF domain elements are mapped to a plurality of UML meta-classes, the relationships including provide, type, groups and protect are mapped to a UML association meta-class, and the relationships including deploy and member node are mapped to a UML dependency meta-class.

* * * * *